(12) United States Patent
Imade

(10) Patent No.: US 8,698,906 B2
(45) Date of Patent: Apr. 15, 2014

(54) IMAGE PROCESSING DEVICE, IMAGING DEVICE, INFORMATION STORAGE MEDIUM, AND IMAGE PROCESSING METHOD

(75) Inventor: Shinichi Imade, Iruma (JP)

(73) Assignee: Olympus Corporation, Tokyo (JP)

( * ) Notice: Subject to any disclaimer, the term of this patent is extended or adjusted under 35 U.S.C. 154(b) by 3 days.

(21) Appl. No.: 13/532,071

(22) Filed: Jun. 25, 2012

(65) Prior Publication Data

US 2012/0320228 A1 Dec. 20, 2012

Related U.S. Application Data

(63) Continuation of application No. PCT/JP2011/050948, filed on Jan. 20, 2011.

(30) Foreign Application Priority Data

Jan. 21, 2010 (JP) .................................. 2010-010656

(51) Int. Cl.
*H04N 5/225* (2006.01)
(52) U.S. Cl.
USPC ...................................... 348/219.1; 348/218.1
(58) Field of Classification Search
USPC .......................... 348/216.1, 218.1, 219.1, 239
See application file for complete search history.

(56) References Cited

U.S. PATENT DOCUMENTS

| 7,944,486 B2 * | 5/2011 | Tanaka et al. ............... 348/230.1 |
| 2007/0215791 A1 | 9/2007 | Yamamoto |
| 2008/0170137 A1 | 7/2008 | Matsumoto et al. |
| 2013/0083220 A1 * | 4/2013 | Imade ........................... 348/239 |

FOREIGN PATENT DOCUMENTS

| JP | 2005-149266 | 6/2005 |
| JP | 2007-251343 | 9/2007 |
| JP | 2008-199581 | 8/2008 |
| JP | 2008-243037 | 10/2008 |
| JP | 2009-124621 | 6/2009 |
| JP | 2009-181508 | 8/2009 |

OTHER PUBLICATIONS

International Search Report dated Apr. 5, 2011 issued in PCT/JP2011/050948.

* cited by examiner

*Primary Examiner* — Timothy J Henn
(74) *Attorney, Agent, or Firm* — Scully, Scott, Murphy & Presser, P.C.

(57) ABSTRACT

Light-receiving unit is set corresponding to a plurality of pixels. The pixel values of a plurality of pixels included in the light-receiving unit are added up, and read as light-receiving value to acquire a low-resolution frame image. The image processing device includes an estimation calculation section that estimates the pixel values of the pixels included in the light-receiving unit based on a plurality of low-resolution frame images, and an image output section that outputs a high-resolution frame image based on the estimated pixel values. The light-receiving value is read while sequentially performing a pixel shift process so that light-receiving units overlap each other. The estimation calculation section estimates the pixel values of the pixels included in the light-receiving unit based on the light-receiving values obtained by performing the pixel shift process.

14 Claims, 30 Drawing Sheets

FIRST INTERMEDIATE PIXEL VALUE PATTERN
$b_{00}$   $b_{10}$   $b_{20}$
(FIRST)        (SECOND)

SECOND INTERMEDIATE PIXEL VALUE PATTERN
$b_{20}$   $b_{30}$   $b_{40}$
(THIRD)        (FOURTH)

THIRD INTERMEDIATE PIXEL VALUE PATTERN
$b_{10}$   $b_{20}$   $b_{30}$
(FIFTH)

FIG. 34
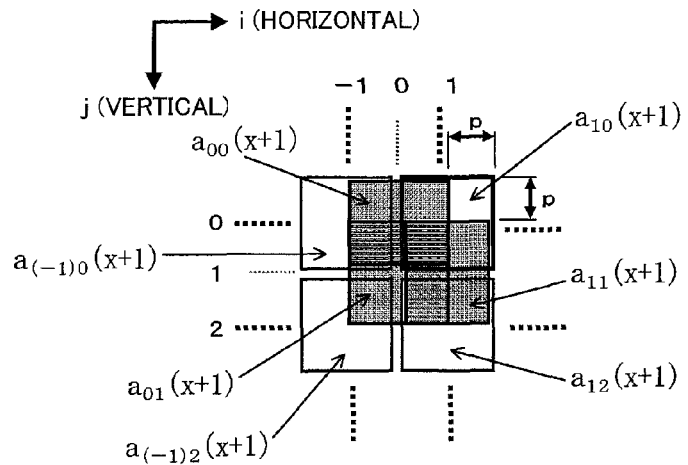
FIG. 35
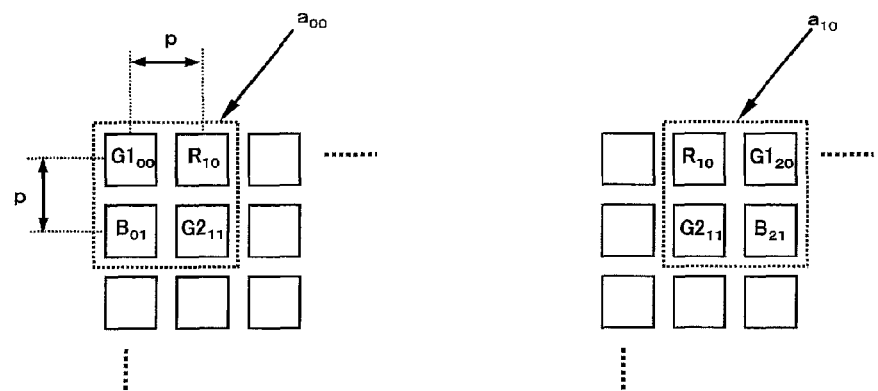
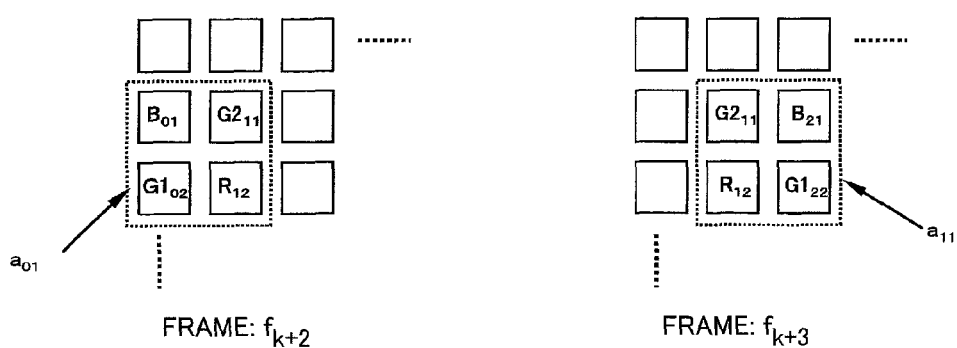

//\# IMAGE PROCESSING DEVICE, IMAGING DEVICE, INFORMATION STORAGE MEDIUM, AND IMAGE PROCESSING METHOD

CROSS REFERENCE TO RELATED APPLICATION

This application is a continuation of International Patent Application No. PCT/JP2011/50948, having an international filing date of Jan. 20, 2011, which designated the United States, the entirety of which is incorporated herein by reference. Japanese Patent Application No. 2010-010656 filed on Jan. 21, 2010 is also incorporated herein by reference in its entirety.

BACKGROUND

The present invention relates to an image processing device, an imaging device, an information storage medium, an image processing method, and the like.

A digital camera or a video camera that allows the user to select a still image shooting mode or a movie shooting mode has been known. For example, a digital camera or a video camera has been known that allows the user to shoot a still image having a resolution higher than that of a movie by operating a button when shooting a movie.

For example, JP-A-2009-124621 and JP-A-2008-243037 disclose a method that generates (synthesizes) a high-resolution image from low-resolution images acquired by the pixel shift process.

SUMMARY

According to one aspect of the invention, there is provided an image processing device comprising:

a storage section that stores a low-resolution frame image acquired based on a light-receiving value, a light-receiving unit being a unit for acquiring the light-receiving value, the light-receiving unit being set corresponding to a plurality of pixels of an image sensor, and pixel values of the plurality of pixels included in the light-receiving unit being added up and read as the light-receiving value of the light-receiving unit;

an estimation calculation section that estimates pixel values of pixels included in the light-receiving unit based on a plurality of low-resolution frame images stored in the storage section; and an image output section that outputs a high-resolution frame image having a resolution higher than that of the low-resolution frame image based on the pixel values estimated by the estimation calculation section, the low-resolution frame image being acquired by reading the light-receiving value of the light-receiving unit while sequentially performing a pixel shift process, and light-receiving units obtained by sequentially performing the pixel shift process overlapping each other, and the estimation calculation section estimating the pixel values of the pixels included in the light-receiving unit based on light-receiving values of the light-receiving units obtained by sequentially performing the pixel shift process.

According to another aspect of the invention, there is provided an imaging device comprising:

an image sensor;

a readout control section that sets light-receiving unit corresponding to a plurality of pixels of the image sensor, and adds up and reads pixel values of the plurality of pixels included in the light-receiving unit as a light-receiving value of the light-receiving unit to acquire a low-resolution frame image;

a storage section that stores the low-resolution frame image acquired by the readout control section;

an estimation calculation section that estimates pixel values of pixels included in the light-receiving unit based on a plurality of low-resolution frame images stored in the storage section; and an image output section that outputs a high-resolution frame image having a resolution higher than that of the low-resolution frame image based on the pixel values estimated by the estimation calculation section, the readout control section acquiring the low-resolution frame image by reading the light-receiving value of the light-receiving unit while sequentially performing a pixel shift process, and light-receiving units obtained by sequentially performing the pixel shift process overlapping each other, and the estimation calculation section estimating the pixel values of the pixels included in the light-receiving unit based on light-receiving values of the light-receiving units obtained by sequentially performing the pixel shift process.

According to another aspect of the invention, there is provided an information storage medium that records a program, the program causing a computer to function as:

a storage section that stores a low-resolution frame image acquired based on a light-receiving value, a light-receiving unit being a unit for acquiring the light-receiving value, the light-receiving unit being set corresponding to a plurality of pixels of an image sensor, and pixel values of the plurality of pixels included in the light-receiving unit being added up and read as the light-receiving value of the light-receiving unit;

an estimation calculation section that estimates pixel values of pixels included in the light-receiving unit based on a plurality of low-resolution frame images stored in the storage section; and an image output section that outputs a high-resolution frame image having a resolution higher than that of the low-resolution frame image based on the pixel values estimated by the estimation calculation section, the low-resolution frame image being acquired by reading the light-receiving value of the light-receiving unit while sequentially performing a pixel shift process, and light-receiving units obtained by sequentially performing the pixel shift process overlapping each other, and the estimation calculation section estimating the pixel values of the pixels included in the light-receiving unit based on light-receiving values of the light-receiving units obtained by sequentially performing the pixel shift process.

According to another aspect of the invention, there is provided an image processing method comprising:

storing a low-resolution frame image acquired based on a light-receiving value, a light-receiving unit being a unit for acquiring the light-receiving value, the light-receiving unit being set corresponding to a plurality of pixels of an image sensor, and pixel values of the plurality of pixels included in the light-receiving unit being added up and read as the light-receiving value of the light-receiving unit;

estimating pixel values of pixels included in the light-receiving unit based on a plurality of light-receiving values that form a plurality of low-resolution, frame images, and the plurality of light-receiving values being obtained by sequentially performing a pixel shift process; and outputting a high-resolution frame image having a resolution higher than that of the low-resolution frame image based on the estimated pixel values.

BRIEF DESCRIPTION OF THE DRAWINGS

FIG. 34 is a view illustrating a second light-receiving value interpolation method.

FIG. 35 is a view illustrating a first color image estimation method.

DESCRIPTION OF EXEMPLARY EMBODIMENTS

Figure 1A:
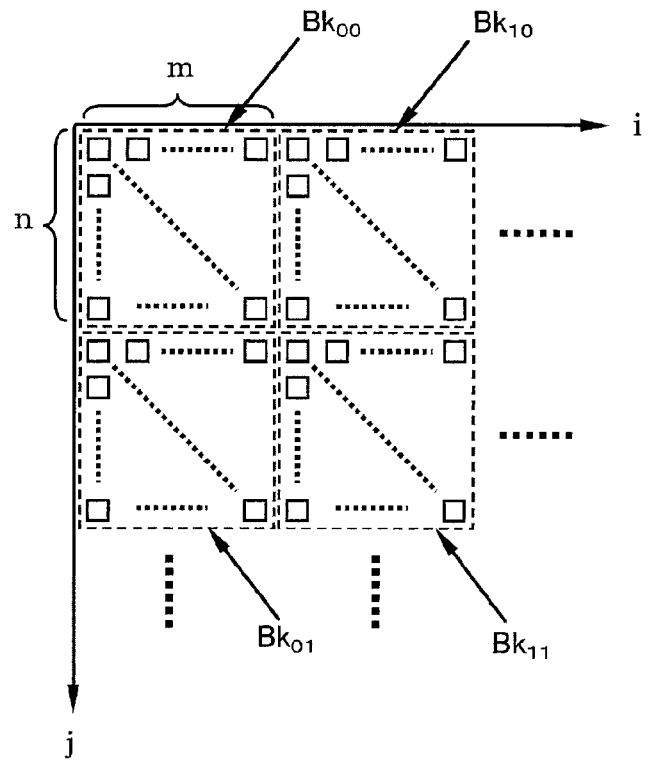
FIG. 1A is a view illustrating an estimation block.

However, when using a method that that allows the user to select the still image shooting mode or the movie shooting mode, the user may have missed the best moment when the user has become aware that it is possible to take the best shot.

In order to shoot the best moment, the inventor of the invention proposes generating a high-resolution still image at an arbitrary timing from a movie by utilizing the pixel shift process method. When using the method disclosed in JP-A-2009-124621 or JP-A-2008-243037, the processing load increases, or it may be difficult to estimate the pixel value.

Several aspects of the invention may provide an image processing device, an imaging device, a program, an image processing method, and the like that can acquire a high-resolution image from a low-resolution movie using a simple process.

According to one embodiment of the invention, there is provided an image processing device comprising:

a storage section that stores a low-resolution frame image acquired based on a light-receiving value, a light-receiving unit being a unit for acquiring the light-receiving value, the light-receiving unit being set corresponding to a plurality of pixels of an image sensor, and pixel values of the plurality of pixels included in the light-receiving unit being added up and read as the light-receiving value of the light-receiving unit;

an estimation calculation section that estimates pixel values of pixels included in the light-receiving unit based on a plurality of low-resolution frame images stored in the storage section; and an image output section that outputs a high-resolution frame image having a resolution higher than that of the low-resolution frame image based on the pixel values estimated by the estimation calculation section, the low-resolution frame image being acquired by reading the light-receiving value of the light-receiving unit while sequentially performing a pixel shift process, and light-receiving units obtained by sequentially performing the pixel shift process overlapping each other, and the estimation calculation section estimating the pixel values of the pixels included in the light-receiving unit based on light-receiving values of the light-receiving units obtained by sequentially performing the pixel shift process.

According to one embodiment of the invention, the pixel values of the pixels included in the light-receiving unit are added up, and read as the light-receiving value to acquire the low-resolution frame image. The light-receiving value is read while sequentially performing the pixel shift process so that the light-receiving units overlap each other. The pixel values of the pixels included in the light-receiving unit are estimated based on the light-receiving values of the light-receiving units obtained by sequentially performing the pixel shift process, and a high-resolution frame image is output based on the estimated pixel values. This makes it possible to acquire a high-resolution image from a low-resolution movie using a simple process, for example.

In the image processing device, the light-receiving units may be sequentially set at a first position and a second position subsequent to the first position using the pixel shift process, and the light-receiving unit set at the first position and the light-receiving unit set at the second position may overlap each other in an overlapping area, the estimation calculation section may calculate a difference between a light-receiving value of the light-receiving unit set at the first position and a light-receiving value of the light-receiving unit set at the second position, the estimation calculation section may express a relational expression between a first intermediate pixel value and a second intermediate pixel value using the difference, the first intermediate pixel value may be a light-receiving value of a first light-receiving area that is an area obtained by removing the overlapping area from the light-receiving unit set at the first position, and the second intermediate pixel value may be a light-receiving value of a second light-receiving area that is an area obtained by removing the overlapping area from the light-receiving unit set at the second position, and the estimation calculation section may estimate the first intermediate pixel value and the second intermediate pixel value using the relational expression, and may calculate the pixel values of the pixels included in the light-receiving unit using the estimated first intermediate pixel value.

This makes it possible to estimate the intermediate pixel values from the light-receiving values that are read while sequentially performing the pixel shift process so that the light-receiving units overlap each other, and calculate the final estimated pixel values from the estimated intermediate pixel values. This makes it possible to easily estimate the pixel values of a high-resolution frame image.

In the image processing device, the estimation calculation section may express a relational expression between intermediate pixel values using the light-receiving value of the light-receiving unit, the intermediate pixel values may be included in an intermediate pixel value pattern, the intermediate pixel value pattern including consecutive intermediate pixel values including the first intermediate pixel value and the second intermediate pixel value, the estimation calculation section may compare the intermediate pixel value pattern expressed by the relational expression between the intermediate pixel values and the light-receiving values of the light-receiving units to evaluate similarity, and the estimation calculation section may determine the intermediate pixel values included in the intermediate pixel value pattern based on a similarity evaluation result so that the similarity becomes a maximum.

This makes it possible to estimate the intermediate pixel values based on the light-receiving values obtained by performing the pixel shift process so that the light-receiving units overlap each other.

In the image processing device, the estimation calculation section may calculate an evaluation function that indicates an error between the intermediate pixel value pattern expressed by the relational expression between the intermediate pixel values and the light-receiving values of the light-receiving units, and may determine the intermediate pixel values included in the intermediate pixel value pattern so that a value of the evaluation function becomes a minimum.

This makes it possible to determine the intermediate pixel values so that the similarity between the intermediate pixel value pattern and the light-receiving values becomes a maximum by determining the intermediate pixel values so that the value of the evaluation function becomes a minimum.

In the image processing device, a relationship may be acquired as prior information based on a known high-resolution frame image, the relationship may be a relationship between the light-receiving values of the light-receiving units and the intermediate pixel value pattern, and the prior information may specify the similarity between the light-receiving values of the light-receiving units and the intermediate pixel value pattern in advance, and the estimation calculation section may evaluate the similarity between the intermediate pixel value pattern expressed by the relational expression between the intermediate pixel values and the light-receiving values of the light-receiving units based on the prior information.

This makes it possible to evaluate the similarity based on the prior information acquired based on a known high-resolution frame image, and determine the intermediate pixel values based on the evaluation result.

In the image processing device, the estimation calculation section may include a neural network that utilizes a node weighting coefficient as the prior information, and the node weighting coefficient may be obtained by learning based on the known high-resolution frame image, the neural network may receive the intermediate pixel value pattern and the light-receiving values of the light-receiving units, and may output the similarity evaluation result, and the estimation calculation section may determine the intermediate pixel values included in the intermediate pixel value pattern based the similarity evaluation result output from the neural network.

This makes it possible to evaluate the similarity based on the prior information by utilizing the neural network that utilizes the node weighting coefficient as the prior information.

In the image processing device, the pixel values of the light-receiving unit may be subjected to a weighted summation process, and may be read as the light-receiving value of the light-receiving unit, and the estimation calculation section may estimate the pixel values of the pixels included in the light-receiving unit based on the light-receiving values of the light-receiving units obtained by the weighted summation process.

This makes it possible to acquire a low-resolution frame image by subjecting the pixel values of the light-receiving unit to the weighted summation process, and estimate the pixel values of a high-resolution frame image from the acquired low-resolution frame image.

In the image processing device, the pixel shift process may be performed in each frame, the light-receiving unit may be sequentially set at a plurality of positions due to the pixel shift process, the light-receiving unit may be set at an identical position every multiple frames, and the plurality of low-resolution frame images may be consecutive low-resolution frame images that are acquired in time series corresponding to the respective positions, the image processing device may further comprise an interpolation section that performs a process that interpolates the light-receiving values of the light-receiving units corresponding to the plurality of positions in each frame, the interpolation section may interpolate the light-receiving value of the light-receiving unit at a missing position in an image in an interpolation target frame by a time-axis interpolation process using the light-receiving values of the light-receiving units in images in frames that respectively precede or follow the interpolation target frame, and the image in the interpolation target frame and the images in the frames that respectively precede or follow the interpolation target frame may be images among the consecutive low-resolution frame images, and the estimation calculation section may estimate the pixel values of the pixels included in the light-receiving unit in each frame based on the consecutive low-resolution frame images subjected to the time-axis interpolation process.

This makes it possible to acquire the light-receiving value using the pixel shift process, interpolate the light-receiving value at the missing position using the acquired light-receiving value, and calculate the pixel values of the pixels of the light-receiving unit from the light-receiving value obtained by the interpolation process.

In the image processing device, the image output section may output the high-resolution frame image in each frame as a still image or a movie, and the high-resolution frame image may be based on the pixel values of the pixels included in the light-receiving unit in each frame that have been estimated by the estimation calculation section.

This makes it possible to output a high-resolution frame image in each frame as a still image or a movie.

In the image processing device, the interpolation section may perform the time-axis interpolation process using a time-axis interpolation filtering process.

This makes it possible to perform the time-axis interpolation process using the time-axis interpolation filtering process.

In the image processing device, the interpolation section may interpolate the light-receiving value of the light-receiving unit at the missing position in the interpolation target frame using the light-receiving value of the light-receiving unit at a position identical with the missing position in the frame that precedes or follows the interpolation target frame when a difference between the light-receiving values of the light-receiving units in the frames that respectively precede or follow the interpolation target frame is smaller than a given threshold value, and the interpolation section may interpolate the light-receiving value of the light-receiving unit at the missing position in the interpolation target frame using the light-receiving value acquired in the interpolation target frame when the difference between the light-receiving values of the light-receiving units in the frames that respectively precede or follow the interpolation target frame is larger than the given threshold value.

This makes it possible to perform the time-axis interpolation process on the light-receiving value in the interpolation target frame corresponding to the difference between the light-receiving values of the light-receiving units in the frames that respectively precede or follow the interpolation target frame.

In the image processing device, a first light-receiving unit and a second light-receiving unit may be adjacent to each other, the first light-receiving unit and the second light-receiving unit may be sequentially set at a first position and a second position subsequent to the first position using the pixel shift process, the first light-receiving unit set at the first position and the first light-receiving unit set at the second position may overlap each other in a first overlapping area, and the second light-receiving unit set at the first position and the second light-receiving unit set at the second position may overlap each other in a second overlapping area, the estimation calculation section may estimate a first intermediate pixel value and a second intermediate pixel value, the first intermediate pixel value may be a light-receiving value of a first light-receiving area that is an area obtained by removing the first overlapping area from the first light-receiving unit set at the first position, and the second intermediate pixel value may be a light-receiving value of a second light-receiving area that is an area obtained by removing the first overlapping area from the first light-receiving unit set at the second position, the estimation calculation section may set a third intermediate pixel value to be an unknown, and the third intermediate pixel value may be a light-receiving value of a third light-receiving area that is an area obtained by removing the second overlapping area from the second light-receiving unit set at the first position, the estimation calculation section may express a fourth intermediate pixel value using a relational expression using the unknown, and the fourth intermediate pixel value may be a light-receiving value of a fourth light-receiving area that is an area obtained by removing the second overlapping area from the second light-receiving unit set at the second position the estimation calculation section may set a search range of the unknown based on the second intermediate pixel value that has been calculated as an intermediate pixel value of the second light-receiving area, the second light-receiving area may be identical with the third light-receiving area, and the estimation calculation section may calculate the unknown within the search range by a search process to estimate the third intermediate pixel value.

This makes it possible to set the search range of an unknown that is subsequently estimated based on the calculated second intermediate pixel value.

In the image processing device, a first light-receiving unit and a second light-receiving unit may be adjacent to each other, the first light-receiving unit and the second light-receiving unit may be sequentially set at a first position and a second position subsequent to the first position using the pixel shift process, the first light-receiving unit set at the first position and the first light-receiving unit set at the second position may overlap each other in a first overlapping area, and the second light-receiving unit set at the first position and the second light-receiving unit set at the second position may overlap each other in a second overlapping area, the estimation calculation section may estimate a first intermediate pixel value pattern that includes consecutive intermediate pixel values including a first intermediate pixel value and a second intermediate pixel value, the first intermediate pixel value may be a light-receiving value of a first light-receiving area that is an area obtained by removing the first overlapping area from the first light-receiving unit set at the first position, and the second intermediate pixel value may be a light-receiving value of a second light-receiving area that is an area obtained by removing the first overlapping area from the first light-receiving unit set at the second position, the estimation calculation section may estimate a second intermediate pixel value pattern that includes consecutive intermediate pixel values including a third intermediate pixel value and a fourth intermediate pixel value, the third intermediate pixel value may be a light-receiving value of a third light-receiving area that is an area obtained by removing the second overlapping area from the second light-receiving unit set at the first position, and the fourth intermediate pixel value may be a light-receiving value of a fourth light-receiving area that is an area obtained by removing the second overlapping area from the second light-receiving unit set at the second position, the estimation calculation section may estimate a third intermediate pixel value pattern that includes consecutive intermediate pixel values that include a fifth intermediate pixel value and do not include the first intermediate pixel value and the fourth intermediate pixel value, and the fifth intermediate pixel value may be a light-receiving value of a fifth light-receiving area that is an overlapping area of the first light-receiving unit set at the second position and the second light-receiving unit set at the first position, and the estimation calculation section may determine the intermediate pixel value of an identical light-receiving area based on the second intermediate pixel value, the third intermediate pixel value, and the fifth intermediate pixel value obtained by estimating the first intermediate pixel value pattern, the second intermediate pixel value pattern, and the third intermediate pixel value pattern, and the identical light-receiving area may correspond to the second light-receiving area that is identical to the third light-receiving area and the fifth light-receiving area.

This makes it possible to determine the final intermediate pixel value of the light-receiving area based on three estimated values obtained by estimating the intermediate pixel value of an identical light-receiving area three times.

In the image processing device, the estimation calculation section may perform a filtering process on the estimated pixel values using a different filtering coefficient depending on a pixel position within the light-receiving unit.

This makes it possible to perform the filtering process corresponding to the pixel position within the light-receiving unit on the estimated pixel values.

In the image processing device, a number of pixels included in the light-receiving unit may be increased as brightness of an object decreases, and the image output section may output the high-resolution frame image with higher sensitivity as the brightness of the object decreases.

This makes it possible to set the number of pixels included in the light-receiving unit corresponding to the brightness of the object, and output a high-resolution frame image having sensitivity corresponding to the brightness of the object.

In the image processing device, the image sensor may be a color image sensor, a plurality of adjacent pixels may be set as the light-receiving unit independently of a color of each pixel, and pixel values of the plurality of adjacent pixels set as the light-receiving unit may be added up, and read to acquire the low-resolution frame image, the estimation calculation section may estimate the pixel values of the pixels included in the light-receiving unit based on the acquired low-resolution frame image, and the image output section may output the high-resolution frame image that is a color image based on the pixel values estimated by the estimation calculation section.

In the image processing device, the image sensor may be a color image sensor, a plurality of pixels corresponding to an identical color may be set as the light-receiving unit, and pixel values of the plurality of pixels corresponding to the identical color and set as the light-receiving unit may be added up, and read to acquire the low-resolution frame image, the estimation calculation section may estimate the pixel values of the pixels included in the light-receiving unit based on the acquired low-resolution frame image, and the image output section may output the high-resolution frame image that is a color image based on the pixel values estimated by the estimation calculation section.

This makes it possible to acquire a low-resolution frame image even when using a color image sensor, and estimate the pixel values from the low-resolution frame image to acquire a color high-resolution frame image.

Preferred embodiments of the invention are described in detail below. Note that the following embodiments do not in any way limit the scope of the invention defined by the claims laid out herein. Note also that all elements of the following embodiments should not necessarily be taken as essential elements of the invention.

1. Comparative Example

A comparative example is described below. A digital camera that is mainly used to shoot a still image may be provided with a movie shooting function, or a video camera that is mainly used to shoot a movie may be provided with a still image shooting function. The user normally uses such a camera while selecting a still image shooting mode or a movie shooting mode. A camera that allows the user to shoot a high-resolution still image at a high frame rate almost equal to that of a movie has been known. The user can perform high-speed continuous shooting at short time intervals using such a camera. These cameras are convenient to the user since the user can shoot a still image and a movie using a single camera.

However, it is difficult for many users to shoot a high-quality still image without missing the best shot when using such a method. For example, when using a method that instantaneously changes the mode to a high-quality still image shooting mode when shooting a movie, the movie may be interrupted, or the user may have missed the best moment when the user has become aware that it is possible to take the best shot.

In order to prevent a situation in which the user misses the best shot, each scene may be shot as a movie, and the best moment may be arbitrarily acquired (captured) from the movie as a high-quality still image. When implementing such a method, it is necessary to shoot a high-resolution image at a high frame rate.

However, it is difficult to shoot a high-resolution image at a high frame rate. For example, in order to successively shoot 12-megapixel images at a frame rate of 60 frames per second (fps), an image sensor that can implement ultrafast imaging, a processing circuit that processes image data at ultrahigh speed, an ultrahigh-speed data compression function, and a recording means that can record a huge amount of data are required. In this case, it is necessary to employ a plurality of image sensors, parallel processing, a large-capacity memory, a high-performance heat dissipation mechanism, and the like. However, these means are unrealistic for consumer products for which a reduction in size and cost is desired. It is possible to obtain a low-quality still image having a resolution almost equal to that of a High-Vision movie (2 megapixels). However, a resolution almost equal to that of a High-Vision movie is insufficient for a still image.

A movie may be shot at a high frame rate by utilizing a high-resolution image sensor that can capture a high-resolution image, and reducing the resolution of the image by performing a pixel thin-out readout process or an adjacent pixel addition readout process to reduce the amount of data read at one time. However, it is impossible to shoot a high-resolution image at a high frame rate using such a method.

Therefore, it is necessary to obtain a high-resolution image from low-resolution images that have been shot at a high frame rate. A high-resolution image may be obtained from low-resolution images by performing a super-resolution process on low-resolution images that have been shot while performing the pixel shift process to generate a high-resolution image, for example.

For example, a method that utilizes an addition readout process may be employed. In this case, a plurality of low-resolution images are sequentially read while performing a position shift process, and a high-resolution image is estimated based on the plurality of low-resolution images. A low-resolution image is generated by causing the estimated high-resolution image to deteriorate, and compared with the original low-resolution image. The high-resolution image is modified so that the difference between the generated low-resolution image and the original low-resolution image becomes a minimum to estimate a high-resolution image. The maximum-likelihood (ML) method, the maximum a posterior (MAP) method, the projection onto convex sets (POCS) method, the iterative back projection (IBP) method, and the like have been known as the super-resolution process.

The method disclosed in JP-A-2009-124621 utilizes the super-resolution process. In the method disclosed in JP-A-2009-124621, low-resolution images are sequentially shot in time series when shooting a movie by performing the pixel shift process, and synthesized to estimate a high-resolution image. The super-resolution process is performed on the estimated high-resolution image to estimate a high-resolution image with high likelihood.

However, the method disclosed in JP-A-2009-124621 utilizes a general super-resolution process that increases the estimation accuracy by repeating calculations that require heavy use of a two-dimensional filter. Therefore, it is difficult to apply the method disclosed in JP-A-2009-124621 to a product that is limited in terms of processing capacity and cost due to an increase in the amount of processing or an increase in processing time. For example, since the scale of a processing circuit necessarily increases when applying the method disclosed in JP-A-2009-124621 to a small portable imaging device such as a digital camera, an increase in power consumption, generation of a large amount of heat, a significant increase in cost, and the like occur.

JP-A-2008-243037 discloses a method that generates a high-resolution image using a plurality of low-resolution images obtained while performing the pixel shift process. The method disclosed in JP-A-2008-243037 estimates the pixel value of a sub-pixel (i.e., a pixel of the desired high-resolution image) so that the average value of the pixel values of the sub-pixels coincides with the pixel value of the low-resolution image. The pixel value is estimated by setting the initial value of a plurality of sub-pixels, subtracting the pixel value of each sub-pixel other than the calculation target sub-pixel from the pixel value of the low-resolution image to calculate a pixel value, and sequentially applying the calculated pixel value to the adjacent pixels.

However, the method disclosed in JP-A-2008-243037 has a problem in that an estimation error increases to a large extent when the initial value is not successfully specified. In the method disclosed in JP-A-2008-243037, an area in which a change in pixel value of the sub-pixels is small and the average value of the pixel values of the sub-pixels is almost equal to the pixel value of the pixel of the low-resolution image that covers the sub-pixels is found from the image when setting the initial value. Therefore, it is difficult to estimate the initial value when an area appropriate for setting the initial value cannot be found from the image. Moreover, the method disclosed in JP-A-2008-243037 requires a process that searches for an area appropriate for setting the initial value.

2. First Estimation Method

According to several embodiments of the invention, a low-resolution movie is shot at a high frame rate while performing the pixel shift process, and a high-resolution image is generated from the low-resolution movie using a simple pixel estimation method. A high-resolution still image at an arbitrary timing of the movie, or a high-resolution movie at a high frame rate is acquired using the generated high-resolution image.

Figure 1B:
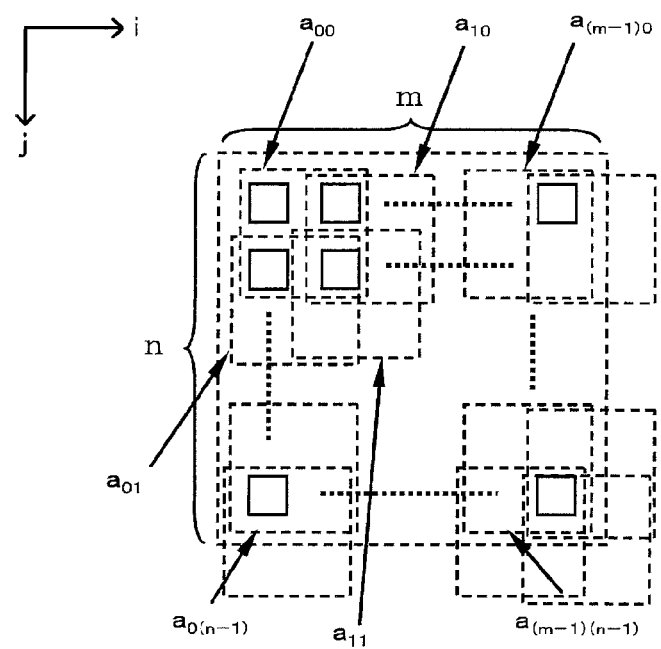
FIG. 1B is a view illustrating a light-receiving unit.

Methods according to several embodiment of the invention are described in detail below with reference to the drawings. FIGS. 1A and 1B are schematic views illustrating an estimation block and a light-receiving unit used for a pixel estimation process. In FIGS. 1A and 1B, each pixel on an image sensor is indicated by a square solid line, the pixel position in the horizontal direction (horizontal scan direction) is indicated by i, and the pixel position in the vertical direction is indicated by j (i and j are natural numbers).

Estimation blocks $Bk_{00}$, $Bk_{10}$, ... that respectively include m×n pixels are set as illustrated in FIG. 1A. The pixel values of a high-resolution image are estimated on an estimation block basis.

FIG. 1B schematically illustrates one estimation block. As illustrated in FIG. 1B, four pixels (a plurality of pixels in a broad sense) are set as one light-receiving unit, and the pixel values of the four pixels within each light-receiving unit are subjected to an addition readout (mixing readout) process to acquire light-receiving values $a_{00}$ to $a_{(m-1)(n-1)}$ (addition pixel values or four-pixel sum values) of the light-receiving units. The light-receiving units are set on a four-pixel basis. The light-receiving values $a_{00}$ to $a_{(m-1)(n-1)}$ are sequentially acquired by shifting the light-receiving units by one pixel every frame. For example, the light-receiving values $a_{00}$, $a_{20}$, ... are acquired in the first frame, the light-receiving values $a_{10}$, $a_{30}$, ... are acquired in the second frame, the light-receiving values $a_{11}$, $a_{31}$, ... are acquired in the third frame, and the light-receiving values $a_{01}$, $a_{21}$, ... are acquired in the fourth frame.

A pixel estimation method according to one embodiment of the invention is described below with reference to FIGS. 2A to 9. The following description illustrates an example in which the estimation blocks are set on a 2×2-pixel basis for convenience of explanation. Note that the light-receiving values $a_{00}$ to $a_{11}$ used for the pixel estimation process may be light-receiving values acquired by the addition readout process, or may be light-receiving values obtained (interpolated) by a time-axis interpolation process (described later).

Figure 2A:
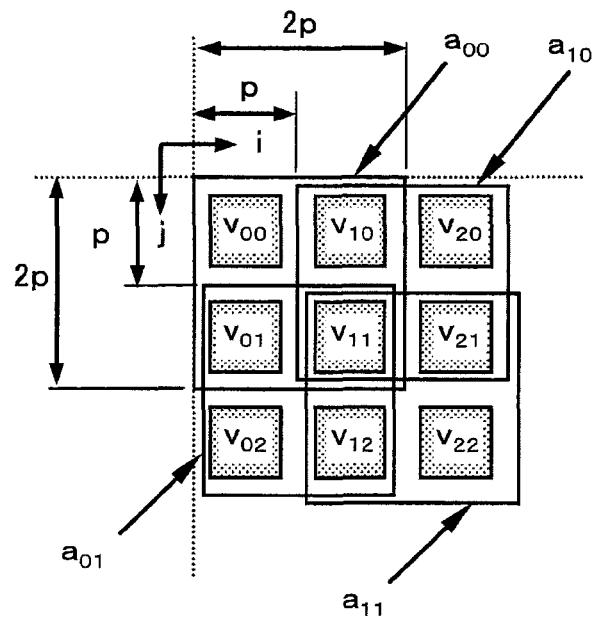
FIG. 2A is a view illustrating an estimated pixel value.
Figure 2B:
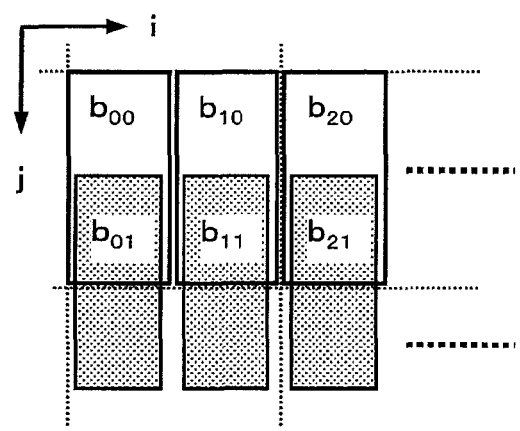
FIG. 2B is a view illustrating an intermediate pixel value.
Figure 3:
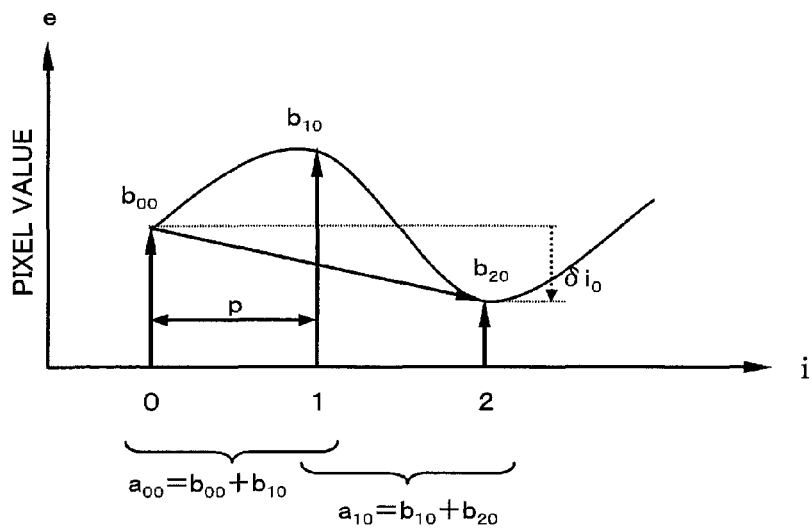
FIG. 3 is a view illustrating an intermediate pixel value estimation method according to a first estimation method.

FIGS. 2A and 2B are views illustrating an estimated pixel value and an intermediate pixel value. As illustrated in FIG. 2A, pixel values $v_{00}$ to $v_{22}$ (estimated pixel values) are estimated using the light-receiving values $a_{00}$ to $a_{11}$. More specifically, when the pixel pitch of the image sensor is referred to as p, a high-resolution image having the same resolution (number of pixels) as that of the image sensor is estimated from a low-resolution image acquired using the light-receiving units having a pixel pitch of 2p.

As illustrated in FIG. 2B, intermediate pixel values $b_{00}$ to $b_{21}$ (intermediate estimated pixel values or two-pixel sum values) are estimated from the light-receiving values $a_{00}$ to $a_{11}$, and the pixel values $v_{00}$ to $v_{22}$ are estimated from the intermediate pixel values $b_{00}$ to $b_{21}$. The intermediate pixel value estimation method is described below using the intermediate pixel values $b_{00}$ to $b_{20}$ in the first row (horizontal direction) (see FIG. 3).

The light-receiving value and the intermediate pixel value have a relationship shown by the following expression (1).

$$a_{00}=b_{00}+b_{10},$$
$$a_{10}=b_{10}+b_{20} \quad (1)$$

The intermediate pixel values $b_{10}$ and $b_{20}$ can be expressed as a function of the intermediate pixel value $b_{00}$ by transforming the expression (1) provided that the intermediate pixel value $b_{00}$ is an unknown (initial variable or initial value) (see the following expression (2)).

$$b_{00}=(\text{unknown}),$$
$$b_{10}=a_{00}-b_{00},$$
$$b_{20}=b_{00}+\delta i_0=b_{00}+(a_{10}-a_{00}) \quad (2)$$

Note that $\delta i_0$ is the difference between the light-receiving values separated by one shift, and corresponds to the difference between the intermediate pixel values $b_{20}$ and $b_{00}$ (see the following expression (3)).

$$\begin{aligned}\delta i_0 &= a_{10} - a_{00} \\ &= (b_{10}+b_{20}) - (b_{00}+b_{10}) \\ &= b_{20} - b_{00}\end{aligned} \quad (3)$$

A combination pattern of the high-resolution intermediate pixel values $\{b_{00}, b_{10}, \text{and } b_{20}\}$ is thus calculated provided that the intermediate pixel value $b_{00}$ is an unknown. It is necessary to calculate the unknown ($b_{00}$) in order to determine the absolute value (value or numerical value) of each intermediate pixel value expressed as a function of the intermediate pixel value $b_{00}$.

Figure 4:
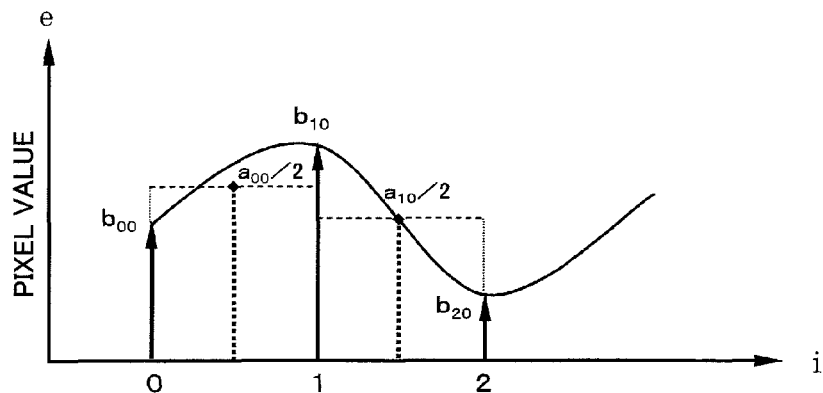
FIG. 4 is a view illustrating an intermediate pixel value estimation method according to a first estimation method.

As illustrated in FIG. 4, the pixel value pattern $\{a_{00}, a_{10}\}$ detected by overlap shift sampling is compared with the intermediate pixel value pattern $\{b_{00}, b_{10}, b_{20}\}$. An unknown ($b_{00}$) that minimizes the error is derived, and set as the intermediate pixel value $b_{00}$.

Figure 5:
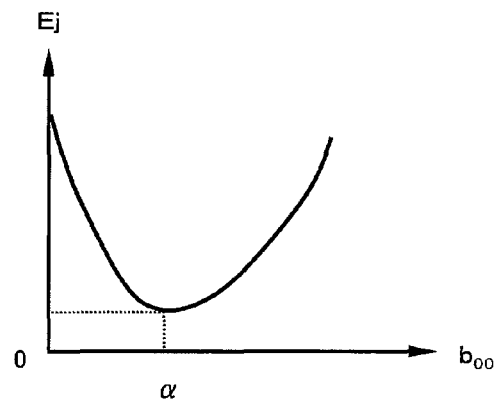
FIG. 5 is a view illustrating an intermediate pixel value estimation method according to a first estimation method.

More specifically, an error evaluation function Ej is expressed as a function of the unknown ($b_{00}$) (see the following expression (4)). As illustrated in FIG. 5, an unknown ($b_{00}$)=α (initial value) at which the value of the evaluation function Ej becomes a minimum (minimum value) is calculated by a search process (least-square method).

$$e_{ij} = \left(\frac{a_{ij}}{2} - b_{ij}\right)^2 + \left(\frac{a_{ij}}{2} - b_{(i+1)j}\right)^2, \quad (4)$$
$$Ej = \sum_{i=0}^{1} e_{ij}$$

In one embodiment of the invention, an error between the average value of the intermediate pixel values and the pattern $\{a_{00}, a_{10}\}$ containing a low-frequency component is evaluated (see the expression (4)). This makes it possible to prevent a situation in which a pattern that contains a large amount of high-frequency component is derived as an estimated solution of the intermediate pixel values $\{b_{00}, b_{10}, b_{20}\}$. Specifically, an image that contains a large amount of low-frequency component is generated even if the unknown is incorrectly estimated. This makes it possible to prevent a situation in which a pattern is generated so that a high-frequency component that tends to produce unnaturalness as compared with a low-frequency component contains an error, so that a natural image is obtained. Therefore, a reasonable pixel estimation process can be performed on a natural image that contains a small amount of high-frequency component as compared with a low-frequency component.

The intermediate pixel value $b_{00}$ thus estimated is substituted into the expression (2) to determine the intermediate pixel values $b_{10}$ and $b_{20}$. The intermediate pixel values $b_{01}$ to $b_{21}$ in the second row are similarly estimated provided that the intermediate pixel value $b_{01}$ is an unknown.

Figure 6A:
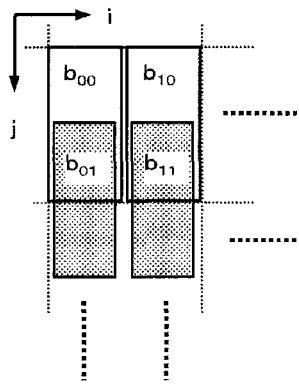
FIGS. 6A and 6B are views illustrating an estimated pixel value estimation method according to a first estimation method.
Figure 6B:
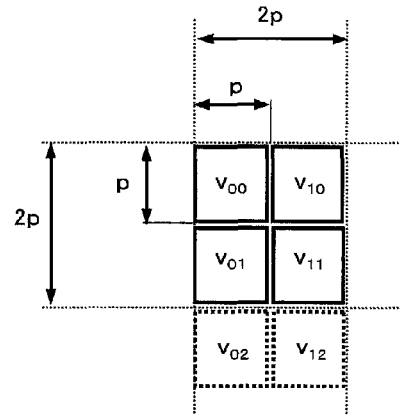
Figure 7:
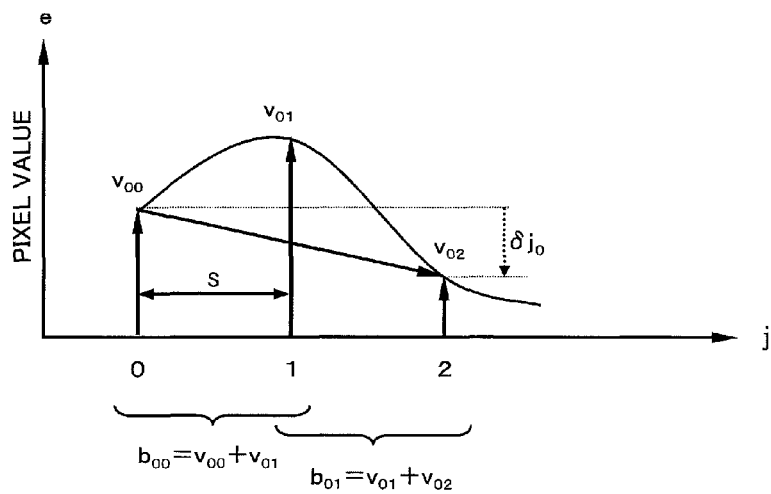
FIG. 7 is a view illustrating an estimated pixel value estimation method according to a first estimation method.

The estimated pixel value $v_{ij}$ is calculated as described below using the estimated intermediate pixel value $b_{ij}$. FIGS. 6A and 6B are views schematically illustrating the intermediate pixel value and the estimated pixel value. As illustrated in FIG. 6A, an estimation process is performed using the intermediate pixel values $b_{00}$ to $b_{11}$ (two columns) among the intermediate pixel values $b_{00}$ to $b_{21}$ (three columns) estimated by the above method. As illustrated in FIG. 6B, the pixel values $v_{00}$ to $v_{12}$ are estimated from the intermediate pixel values $b_{00}$ to $b_{11}$. The following description is given using the pixel values $v_{00}$ to $v_{02}$ in the first column (see FIG. 7) for convenience of explanation.

The pixel values $v_{00}$ to $v_{02}$ are estimated by a method similar to the intermediate pixel value estimation method. More specifically, the intermediate pixel values $b_{00}$ and $b_{01}$ are equal to values obtained by overlap sampling while shifting the pixel values $v_{00}$ to $v_{02}$ while performing a pixel shift process by one pixel in the vertical direction. Therefore, the intermediate pixel values and the estimated pixel values have a relationship shown by the following expression (5).

$$b_{00}=v_{00}+v_{01}$$
$$b_{01}=v_{01}+v_{02} \quad (5)$$

The pixel values $v_{01}$ and $v_{02}$ can be expressed as a function of an unknown ($v_{00}$) (see the following expression (6)).

$$v_{00}=(\text{unknown}),$$
$$v_{01}=b_{00}-v_{00},$$
$$v_{02}=v_{00}+\delta j_0=v_{00}+(b_{01}-b_{00}) \quad (6)$$

Note that $\delta j_0$ is the difference between the adjacent intermediate pixel values, and corresponds to the difference between the pixel values $v_{02}$ and $v_{00}$ (see the following expression (7)).

$$\begin{aligned}\delta i_0 &= b_{01} - b_{00} \\ &= (v_{01}+v_{02}) - (v_{00}+v_{01}) \\ &= v_{02} - v_{00}\end{aligned} \quad (7)$$

Figure 8:
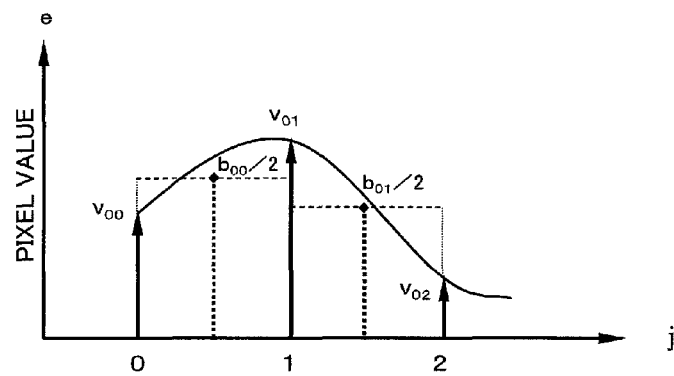
FIG. 8 is a view illustrating an estimated pixel value estimation method according to a first estimation method.
Figure 9:
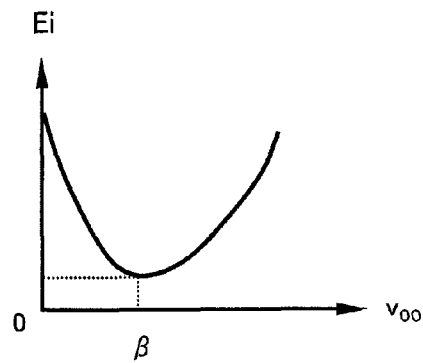
FIG. 9 is a view illustrating an estimated pixel value estimation method according to a first estimation method.

As illustrated in FIG. 8, the unknown ($v_{00}$) is derived so that an error between the intermediate pixel value pattern $\{b_{00}, b_{10}\}$ and the estimated pixel value pattern $\{v_{00}, v_{01}, v_{02}\}$ becomes a minimum. Specifically, an unknown ($v_{00}$)=β at which the value of an error evaluation function Ei (see the following expression (8)) becomes a minimum (see FIG. 9) is calculated by a search process.

$$e_{ij} = \left(\frac{b_{ij}}{2} - v_{ij}\right)^2 + \left(\frac{b_{ij}}{2} - v_{i(j+1)}\right)^2, \quad (8)$$

-continued $$Ei = \sum_{j=0}^{1} e_{ij}$$

The pixel values $v_{10}$ to $v_{12}$ in the second column are calculated in the same manner as described above to determine the final estimated pixel values $v_{00}$, $v_{01}$, $v_{10}$, and $v_{11}$. Note that an appropriate noise reduction process may be performed on the image data having the final estimated pixel values to obtain a display image.

Although an example in which the unknown ($b_{00}$ or $v_{00}$) is calculated by a search process has been described above, the unknown ($b_{00}$ or $v_{00}$) may be calculated directly. Specifically, since the expression (4) (i.e., a quadratic function formula of the unknown ($b_{00}$)) that indicates the evaluation function Ej can be transformed into the following expression (9). Therefore, the minimum value a of the unknown ($b_{00}$) at which the value of the evaluation function Ej becomes a minimum can be calculated directly. The minimum value β of the unknown ($v_{00}$) can be calculated in the same manner as the unknown ($b_{00}$).

$$Ej = (b_{00} - \alpha)^2 + \xi \quad (9)$$

When using a method that allows the user to select the still image shooting mode or the movie shooting mode, the user may have missed the best moment when the user has become aware that it is possible to take the best shot. When using a method that generates (synthesizes) a high-resolution still image from a low-resolution movie using the super-resolution process, the scale of a processing circuit necessarily increases since the processing load of the super-resolution process is high, for example.

According to one embodiment of the invention, the light-receiving units (light-receiving value acquisition units) (i.e., units for acquiring the light-receiving value (addition pixel value or four-pixel sum value)) are set corresponding to a plurality of pixels of the image sensor. The pixel values of a plurality of pixels included in each of the light-receiving units are added up, and read as the light-receiving value of each of the light-receiving units to acquire a low-resolution frame image. The low-resolution frame image thus acquired is stored, and the pixel values of pixels included in each of the light-receiving units is estimated based on a plurality of low-resolution frame images that have been stored. A high-resolution frame image having a resolution higher than that of the low-resolution frame image is output based on the estimated pixel values. The low-resolution frame image is acquired by reading the light-receiving values of the light-receiving units while sequentially performing a pixel shift process so that the light-receiving units overlap each other. The pixel values of the pixels included in each of the light-receiving units are estimated based on a plurality of light-receiving values obtained by sequentially subjecting the light-receiving units to the pixel shift process.

For example, the light-receiving units are set on a four-pixel basis (see FIG. 1B). The light-receiving values $a_{00}$, $a_{20}$, ... are read in the first frame by the addition readout process to acquire a low-resolution frame image having the light-receiving values $a_{00}$, $a_{20}$, .... A low-resolution frame image having the light-receiving values $a_{10}$, $a_{30}$, ..., a low-resolution frame image having the light-receiving values $a_{11}$, $a_{31}$, ..., and a low-resolution frame image having the light-receiving values $a_{01}$, $a_{21}$, ... are then sequentially acquired. For example, the light-receiving units that respectively acquire the light-receiving values $a_{00}$, $a_{10}$, $a_{11}$, and $a_{01}$ are shifted by one pixel in the horizontal direction or the vertical direction so that the light-receiving units overlap each other by two pixels. The low-resolution frame images are acquired by an imaging device (see FIG. 31, for example). The low-resolution frame images thus acquired are input to an image processing device (see FIG. 31, for example), and stored in a storage section (e.g., memory) (not illustrated). A pixel value estimation calculation section (estimation calculation section) estimates the pixel values of the pixel included in each of the light-receiving units (i.e., the pixel values of the pixels included in the estimation block) based on the light-receiving values $a_{00}$ to $a_{(m-1)(n-1)}$ acquired using the pixel shift process. A high-resolution image having a resolution almost equal to that of the image sensor is output based on the estimated pixel values.

This makes it possible to acquire a high-resolution image from a movie using a simple process. For example, the estimation process can be simplified by utilizing the intermediate pixel value estimation process. Since a high-resolution still image at an arbitrary timing of the low-resolution movie can be generated, the user can easily obtain a high-resolution still image at the best moment. Moreover, a low-resolution movie (e.g., 3 megapixels) can be shot at a high frame rate (e.g., 60 fps), and a high-resolution still image (12 megapixels) or a High-Vision movie can arbitrarily be displayed.

In one embodiment of the invention, the light-receiving units are sequentially set at a first position and a second position subsequent to the first position using the pixel shift process. The light-receiving unit set at the first position and the light-receiving unit set at the second position overlap each other. The difference between the light-receiving value of the light-receiving unit set at the first position and the light-receiving value of the light-receiving unit set at the second position is calculated. A relational expression between a first intermediate pixel value and a second intermediate pixel value is expressed using the difference, the first intermediate pixel value being a light-receiving value of a first light-receiving area that is obtained by removing the overlapping area from the light-receiving unit set at the first position, and the second intermediate pixel value being a light-receiving value of a second light-receiving area that is obtained by removing the overlapping area from the light-receiving unit set at the second position. The first intermediate pixel value and the second intermediate pixel value are estimated using the relational expression, and the pixel values of the pixels included in the light-receiving unit are calculated using the estimated first intermediate pixel value.

For example, the light-receiving unit is set at the first position (where the light-receiving value $a_{00}$ is acquired) in the first frame, and the light-receiving unit is set at the second position (where the light-receiving value $a_{10}$ is acquired) in the second frame (see FIG. 2A). These light-receiving units overlap each other in an area that includes the estimated pixels $v_{10}$ and $v_{11}$. An area that includes the estimated pixels $v_{00}$ and $v_{01}$ corresponds to the first light-receiving area, and the intermediate pixel value $b_{00}$ of the area that includes the estimated pixels $v_{00}$ and $v_{01}$ corresponds to the first intermediate pixel value (see FIGS. 2A and 2B). An area that includes the estimated pixels $v_{20}$ and $v_{21}$ corresponds to the second light-receiving area, and the intermediate pixel value $b_{20}$ of the area that includes the estimated pixels $v_{20}$ and $v_{21}$ corresponds to the second intermediate pixel value. The difference $\delta i_0$ between the light-receiving values $a_{00}$ and $a_{10}$ is calculated, and the relational expression "$b_{20} = b_{00} + \delta i_0$" is obtained (see FIG. 3). The unknown ($b_{00}$) is estimated, and the intermediate pixel value $b_{20}$ is estimated using the relational expression (see FIG. 4, for example). The estimated pixel values $v_{00}$ and $v_{01}$ are calculated using the intermediate pixel value $b_{00}$ (see FIG. 6A, for example).

The high-resolution image estimation process can be simplified by estimating the intermediate pixel values from the light-receiving values obtained using the overlap shift process, and calculating the estimated pixel values from the intermediate pixel values. For example, a complex process (e.g., repeated calculations using a two-dimensional filter (JP-A-2009-124621) or a process that searches for an area appropriate for setting the initial value (JP-A-2008-243037)) employed in the comparative example can be made unnecessary.

In one embodiment of the invention, a relational expression between intermediate pixel values of an intermediate pixel value pattern is expressed using the light-receiving values of the light-receiving units, the intermediate pixel value pattern including consecutive intermediate pixel values (in order) including the first intermediate pixel value and the second intermediate pixel value. The intermediate pixel value pattern and the light-receiving value pattern (i.e., the light-receiving values of the light-receiving units) are compared to evaluate similarity, and the intermediate pixel values of the intermediate pixel value pattern are determined based on the evaluation result so that the similarity becomes a maximum.

For example, the consecutive intermediate pixel values $\{b_{00}, b_{10}, b_{20}\}$ correspond to the intermediate pixel value pattern (see FIG. 4), and the relational expression between the intermediate pixel values $\{b_{00}, b_{10}, b_{20}\}$ is expressed using the light-receiving values $a_{00}$ and $a_{10}$ (see the expression (2)). The intermediate pixel value pattern $\{b_{00}, b_{10}, b_{20}\}$ and the light-receiving value pattern $\{a_{00}, a_{10}\}$ are compared, and the intermediate pixel values $\{b_{00}, b_{10}, b_{20}\}$ are determined so that the similarity indicated by the evaluation function Ej becomes a maximum. The light-receiving value pattern $\{a_{00}, a_{10}\}$ includes the light-receiving values that are consecutive (in order) in the horizontal direction.

This makes it possible to estimate the intermediate pixel values based on the light-receiving values obtained by performing the pixel shift process so that the light-receiving units overlap each other.

More specifically, the evaluation function that indicates an error between the intermediate pixel value pattern expressed by the relational expression between the intermediate pixel values and the light-receiving value pattern (i.e., the light-receiving values of the light-receiving units) is calculated. The intermediate pixel values of the intermediate pixel value pattern are determined so that the value of the evaluation function becomes a minimum For example, the intermediate pixel value pattern $\{b_{00}, b_{10}, b_{20}\}$ is expressed as a function of the unknown $(b_{00})$, and an error between the intermediate pixel value pattern $\{b_{00}, b_{10}, b_{20}\}$ and the light-receiving value pattern $\{a_{00}, a_{10}\}$ is expressed by the evaluation function Ej (see the expression (4), for example). An unknown $(b_{00})=\alpha$ (initial value) at which the value of the evaluation function Ej becomes a minimum is calculated (see FIG. 5), and the intermediate pixel values $b_{00}$ to $b_{20}$ are determined by the calculated intermediate pixel value $b_{00}$.

The intermediate pixel values can thus be estimated by expressing the error using the evaluation function, and calculating the intermediate pixel value that corresponds to the minimum value of the evaluation function. For example, the initial value of the intermediate pixel estimation process can be set using a simple process by calculating the unknown using the least-square method. Specifically, it is unnecessary to search for an image area appropriate for setting the initial value, differing from the comparative example (JP-A-2008-243037).

3. Second Estimation Method

The intermediate pixel value $b_{20}$ is also estimated in the estimation block set to the intermediate pixel values $b_{00}$ and $b_{10}$ (see FIG. 2B, for example). The intermediate pixel value $b_{20}$ corresponds to an unknown (initial variable) in the next estimation block set to the intermediate pixel values $b_{20}$ and $b_{30}$. The unknown $(b_{20})$ can be quickly estimated by utilizing the estimated intermediate pixel value $b_{20}$.

A second estimation method that can quickly estimate an unknown is described below with reference to FIGS. 10 to 15. The following description illustrates an example in which the intermediate pixel value (e.g., $b_{20}$) is estimated. Note that the estimated pixel value (e.g., $v_{02}$) can also be estimated by the following method.

Figure 10:
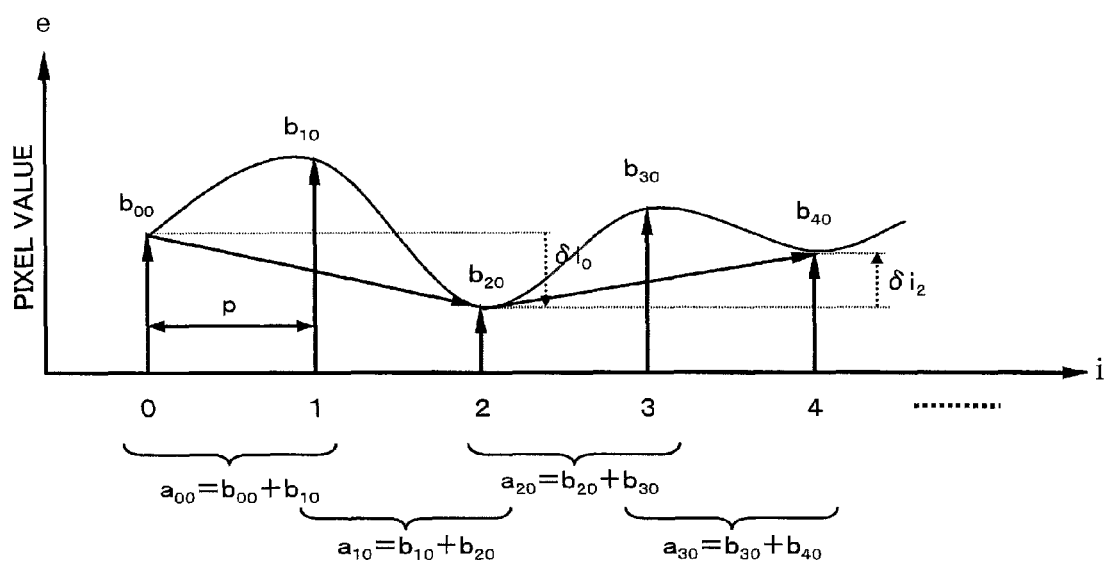
FIG. 10 is a view illustrating a second estimation method.

As illustrated in FIG. 10, the light-receiving values $a_{00}$ and $a_{10}$ in the first row (horizontal direction) detected by overlap shift sampling satisfy the following expression (10).

$$a_{00} = b_{00} + b_{10},$$

$$a_{10} = b_{10} + b_{20} \tag{10}$$

The following expression (11) is satisfied provided that the intermediate pixel value $b_{00}$ is an unknown.

$$b_{00} = (\text{unknown}),$$

$$b_{10} = a_{00} - b_{00},$$

$$b_{20} = b_{00} + \delta i_0 = b_{00} + (a_{10} - a_{00}) \tag{11}$$

$\delta i_0$ is shown by the following expression (12).

$$\delta i_0 = a_{10} - a_{00} \tag{12}$$
$$= (b_{10} + b_{20}) - (b_{00} + b_{10})$$
$$= b_{20} - b_{00}$$

Figure 11:
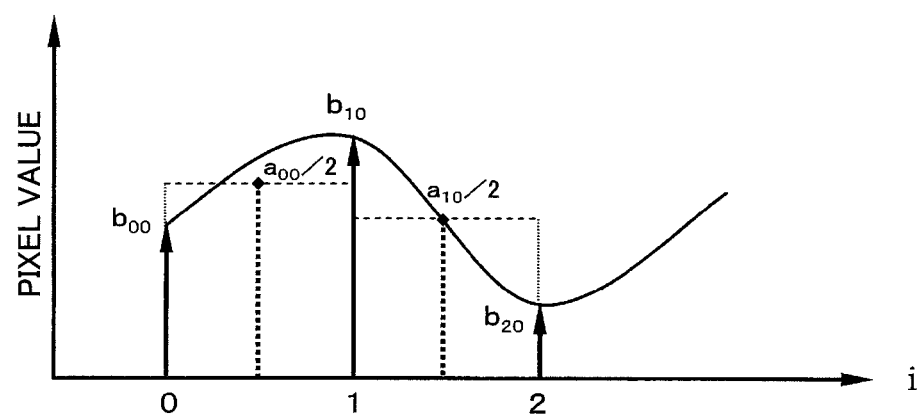
FIG. 11 is a view illustrating a second estimation method.
Figure 12:
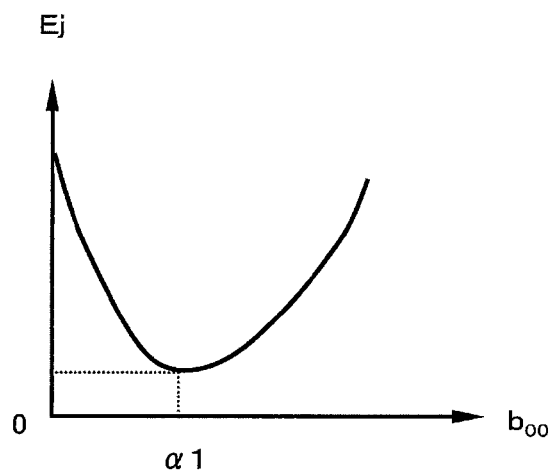
FIG. 12 is a view illustrating a second estimation method.

As illustrated in FIG. 11, the light-receiving value pattern $\{a_{00}, a_{10}\}$ is compared with the intermediate pixel value pattern $\phi_0 = \{b_{00}, b_{10}, b_{20}\}$. More specifically, the error evaluation function Ej is expressed as a function of the unknown $(b_{00})$ (see the following expression (13)). As illustrated in FIG. 12, an unknown $(b_{00}) = \alpha 1$ at which the value of the evaluation function Ej becomes a minimum is calculated by a search process, and the intermediate pixel values $b_{10}$ and $b_{20}$ are determined using the expression (11).

$$e_{ij} = \left(\frac{a_{ij}}{2} - b_{ij}\right)^2 + \left(\frac{a_{ij}}{2} - b_{(i+1)j}\right)^2, \tag{13}$$

$$Ej = \sum_{i=0}^{1} e_{ij}$$

Likewise, the next unknown $b_{20}$ (initial variable) in the horizontal direction is calculated, and the intermediate pixel value pattern $\phi_2 = \{b_{20}, b_{30}, b_{40}\}$ is calculated. Specifically, the light-receiving values $a_{20}$ and $a_{30}$ satisfy the following expression (14) (see FIG. 13).

$$a_{20} = b_{20} + b_{30},$$

$$a_{30} = b_{30} + b_{40} \tag{14}$$

The following expression (15) is satisfied provided that the intermediate pixel value $b_{20}$ is an unknown.

$$b_{20} = (\text{unknown}),$$

$$b_{30} = a_{20} - b_{20},$$

$$b_{40} = b_{20} + \delta i_2 = b_{20} + (a_{30} - a_{20}) \quad (15)$$

$\delta i_2$ (i.e., the difference between the adjacent light-receiving values) is shown by the following expression (16).

$$\begin{aligned} \delta i_2 &= a_{30} - a_{20} \\ &= (b_{30} + b_{40}) - (b_{20} + b_{30}) \\ &= b_{40} - b_{20} \end{aligned} \quad (16)$$

Figure 13:
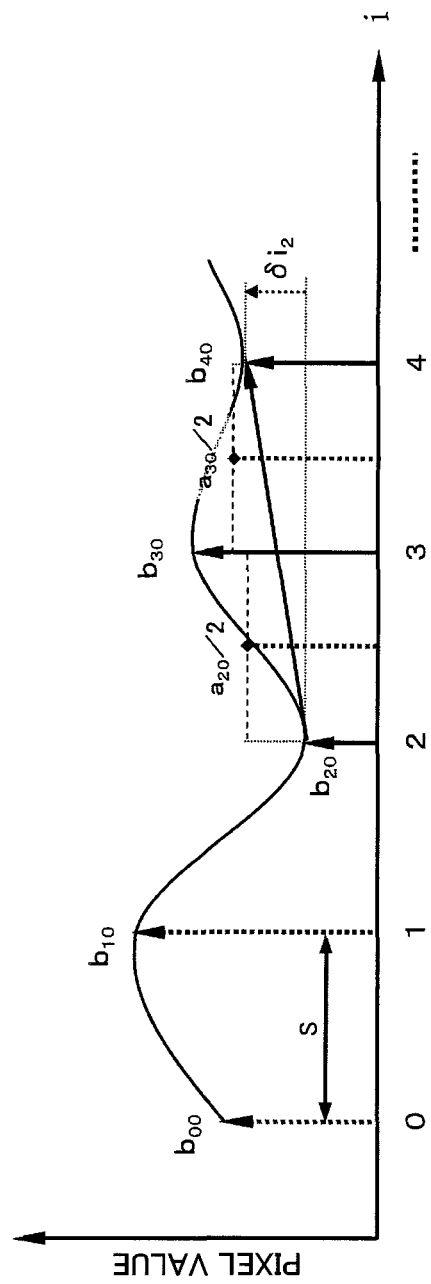
FIG. 13 is a view illustrating a second estimation method.

As illustrated in FIG. 13, the light-receiving value pattern $\{a_{20}, a_{30}\}$ is compared with the intermediate pixel value pattern $\phi_2 = \{b_{20}, b_{30}, b_{40}\}$. More specifically, the error evaluation function Ej is expressed as a function of the unknown ($b_{20}$) (see the following expression (17)).

$$e_{ij} = \left(\frac{a_{ij}}{2} - b_{ij}\right)^2 + \left(\frac{a_{ij}}{2} - b_{(i+1)j}\right)^2, \quad (17)$$

$$Ej = \sum_{i=2}^{3} e_{ij}$$

Figure 14:
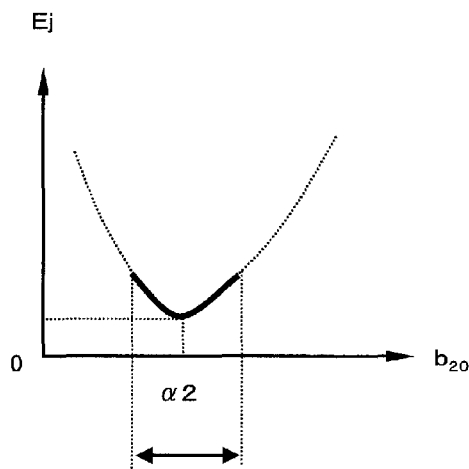
FIG. 14 is a view illustrating a search range setting method according to a second estimation method.

The intermediate pixel value $b_{20}$ has been calculated when estimating the intermediate pixel values $b_{00}$ to $b_{20}$. As illustrated in FIG. 14, a range around the intermediate pixel value $b_{20}$ ($=\alpha 1 + \delta i_0$) is set as a search range. The unknown ($b_{20}$) is changed within the search range to determine the intermediate pixel value $b_{00} = \alpha 2$ at which the value of the evaluation function Ej becomes a minimum. This makes it possible to significantly reduce the number of calculations shown by the expression (17), and increase the speed of the estimation process.

Figure 15:
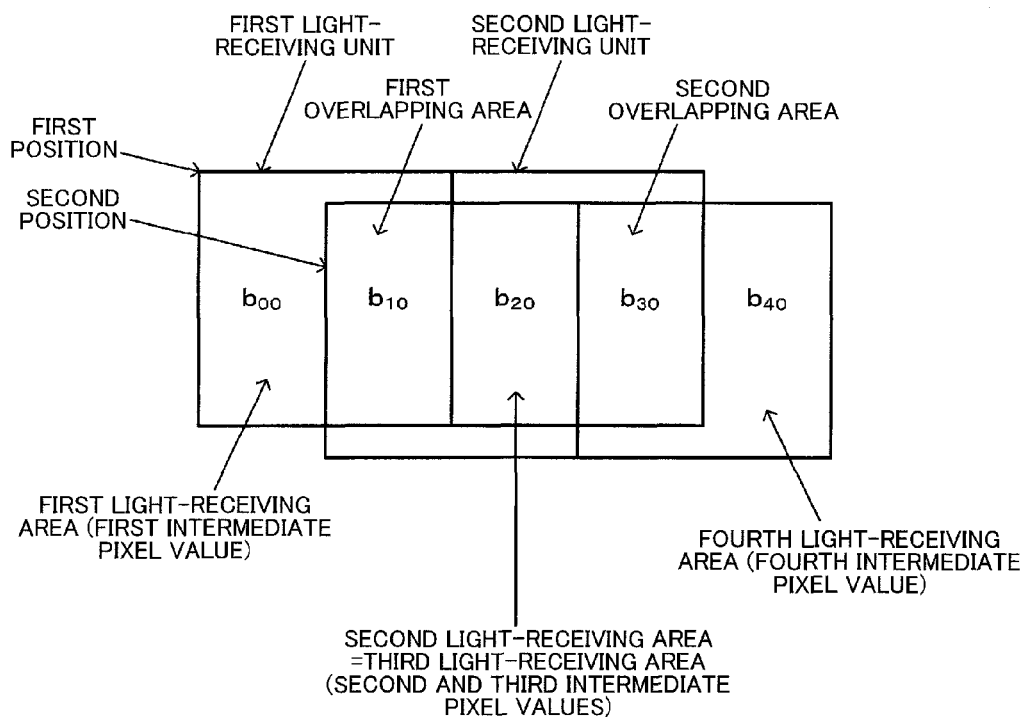
FIG. 15 is a view illustrating an outline of a second estimation method.

According to the second estimation method, a first light-receiving unit and a second light-receiving unit are adjacent to each other (see FIG. 15). The first light-receiving unit and the second light-receiving unit are sequentially set at a first position and a second position subsequent to the first position using the pixel shift process. The first light-receiving unit set at the first position and the first light-receiving unit set at the second position overlap each other in a first overlapping area, and the second light-receiving unit set at the first position and the second light-receiving unit set at the second position overlap each other in a second overlapping area.

An area obtained by removing the first overlapping area from the first light-receiving unit set at the first position is a first light-receiving area. An area obtained by removing the first overlapping area from the first light-receiving unit set at the second position is a second light-receiving area. A first intermediate pixel value and a second intermediate pixel value (e.g., $b_{00}$ and $b_{20}$) (i.e., the light-receiving value of the first light-receiving area and the light-receiving value of the second light-receiving area) are estimated ($b_{00} = \alpha 1$, $b_{20} = \alpha 1 + \delta i_0$).

An area obtained by removing the second overlapping area from the second light-receiving unit set at the first position is a third light-receiving area. An area obtained by removing the second overlapping area from the second light-receiving unit set at the second position is a fourth light-receiving area. A third intermediate pixel value ($b_{20}$) (i.e., the light-receiving value of the third light-receiving area) is an unknown, and a fourth intermediate pixel value ($b_{40}$) (i.e., the light-receiving value of the fourth light-receiving area) is expressed by the relational expression ($b_{40} = b_{20} + \delta i_2$) using the unknown ($b_{20}$).

The third light-receiving area is identical with the second light-receiving area. The search range of the unknown ($b_{20}$) (i.e., third intermediate pixel value) is set based on the second intermediate pixel value ($b_{20} = \alpha 1 + \delta i_0$) that has been calculated as the intermediate pixel value of the second light-receiving area. The unknown ($b_{20}$) is calculated within the search range by a search process to estimate the third intermediate pixel value ($b_{20} = \alpha 2$).

This makes it possible to quickly estimate the intermediate pixel value. Specifically, the search range of the unknown ($b_{20}$) that is estimated in the next estimation block can be set based on the second intermediate pixel value ($b_{20} = \alpha 1 + \delta i_0$) that has been calculated. This makes it possible to limit the search range of the unknown ($b_{20}$), and reduce the number of searches.

4. Third Estimation Method

Although an example in which an unknown (e.g., $b_{00}$ or $b_{20}$) is estimated only once has been described above, an unknown may be estimated a plurality of times, and determined with high accuracy based on a plurality of estimated values. A third estimation method that determines an unknown from a plurality of estimated values is described below with reference to FIGS. 16 and 17. The following description illustrates an example in which the intermediate pixel value ($b_{20}$) is estimated. Note that the estimated pixel value (e.g., $v_{02}$) can also be estimated by the following method.

Figure 16:
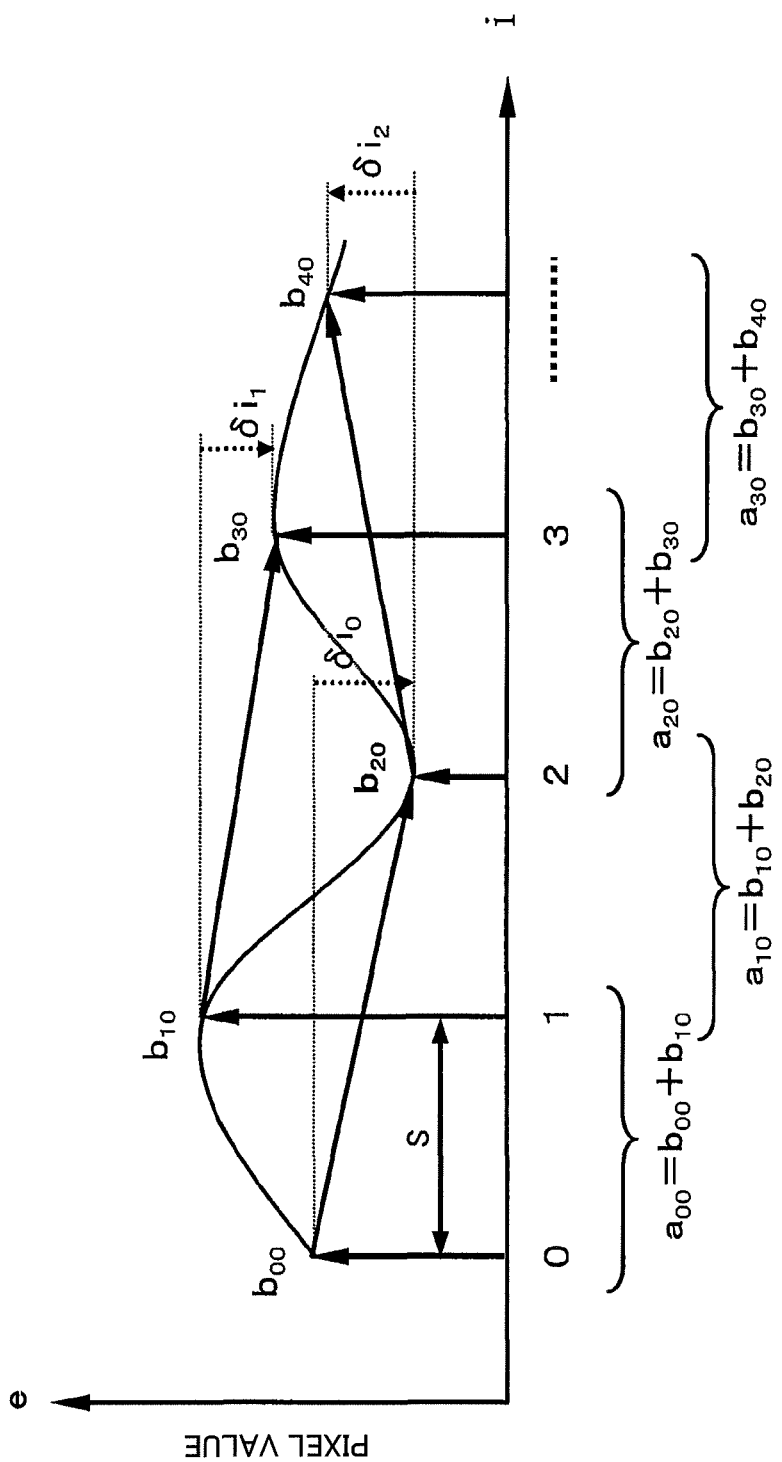
FIG. 16 is a view illustrating a third estimation method.

As illustrated in FIG. 16, the high-resolution intermediate pixel values $\phi_0 = \{b_{00}, b_{10}, b_{20}\}$ are calculated from the light-receiving values $\{a_{00}, a_{10}\}$ in the horizontal direction detected by overlap shift sampling. The intermediate pixel values $\phi_0 = \{b_{00}, b_{10}, b_{20}\}$ are calculated by a method similar to the method using the expressions (10) to (13).

The high-resolution intermediate pixel values $\phi_1 = \{b_{10}, b_{20}, b_{30}\}$ are calculated from the light-receiving values $\{a_{10}, a_{20}\}$ by a method similar to the method using the expressions (14) to (17). The high-resolution intermediate pixel values $\phi_2 = \{b_{20}, b_{30}, b_{40}\}$ are calculated from the light-receiving values $\{a_{20}, a_{30}\}$ by a method similar to the method using the expressions (14) to (17).

The intermediate pixel value $b_{20}$ is included in the sets $\phi_0$, $\phi_1$, and $\phi_2$. Therefore, three estimated values of the intermediate pixel value $b_{20}$ are obtained by the three estimation calculations. The final intermediate pixel value $b_{20}$ is determined from the three estimated values. For example, the final intermediate pixel value $b_{20}$ may be determined by any of the following first to fourth determination methods.

The first determination method determines the average value of the three estimated values to be the final intermediate pixel value $b_{20}$.

The second determination method specifies two values among the three estimated values between which the difference is the smallest, and determines the average value of the two estimated values to be the final intermediate pixel value $b_{20}$. This method can improve the unknown estimation accuracy by utilizing two close estimated values as probable estimated values.

The third determination method adds up the pixel values of a number of known high-resolution image samples to calculate the light-receiving values and the intermediate pixel values. An intermediate pixel value pattern having high occurrence probability with respect to the light-receiving value pattern is specified in advance from the light-receiving values and the intermediate pixel values. An intermediate pixel value pattern having high occurrence probability with respect to the light-receiving value pattern acquired by shooting is determined referring to the relationship specified in advance. One of the intermediate pixel value patterns $\phi_0$, $\phi_1$, and $\phi_2$ that is closest to the calculated intermediate pixel value pattern is determined, and the intermediate pixel value $b_{20}$ included in the determined intermediate pixel value pattern is determined to be the final intermediate pixel value $b_{20}$ as the most probable value. This method can estimate the pixel values while reflecting a known image (e.g., natural image).

The fourth determination method determines the final intermediate pixel value $b_{20}$ based on the degree of change in the differences $\delta i_0$, $\delta i_1$, and $\delta i_2$ between the pixel values $a_{00}$ and $a_{30}$ used to derive the three estimated values. A degree-of-change combination pattern $\xi=\{\delta i_0, \delta i_1, \delta i_2\}$ is used to determine the final intermediate pixel value $b_{20}$. The pixel values of a number of known high-resolution image samples are added up to calculate the element patterns $\phi_0$, $\phi_1$, and $\phi_2$ and the combination pattern The occurrence probability distribution of the intermediate pixel value $b_{20}$ with respect to the combination pattern $\xi$ is calculated in advance from the element patterns and the combination pattern $\xi$. The occurrence probability distribution of the intermediate pixel value $b_{20}$ with respect to the difference pattern $\xi$ calculated from the shot image is calculated referring to the occurrence probability distribution calculated in advance. One of the three estimated values obtained by the estimation calculations that has the highest occurrence probability is determined using the occurrence probability distribution to specify the final intermediate pixel value $b_{20}$. Specifically, since the occurrence probability of the intermediate pixel value $b_{20}$ with respect to the degree-of-change combination pattern $\xi$ is known in advance, the most probable intermediate pixel value $b_{20}$ can be determined from the three estimated values using the combination pattern This method can estimate the pixel value while reflecting a known image (e.g., natural image). Moreover, the pixel value can be estimated corresponding to the degree of change in the pixel value independently of the pixel value itself.

Figure 17:
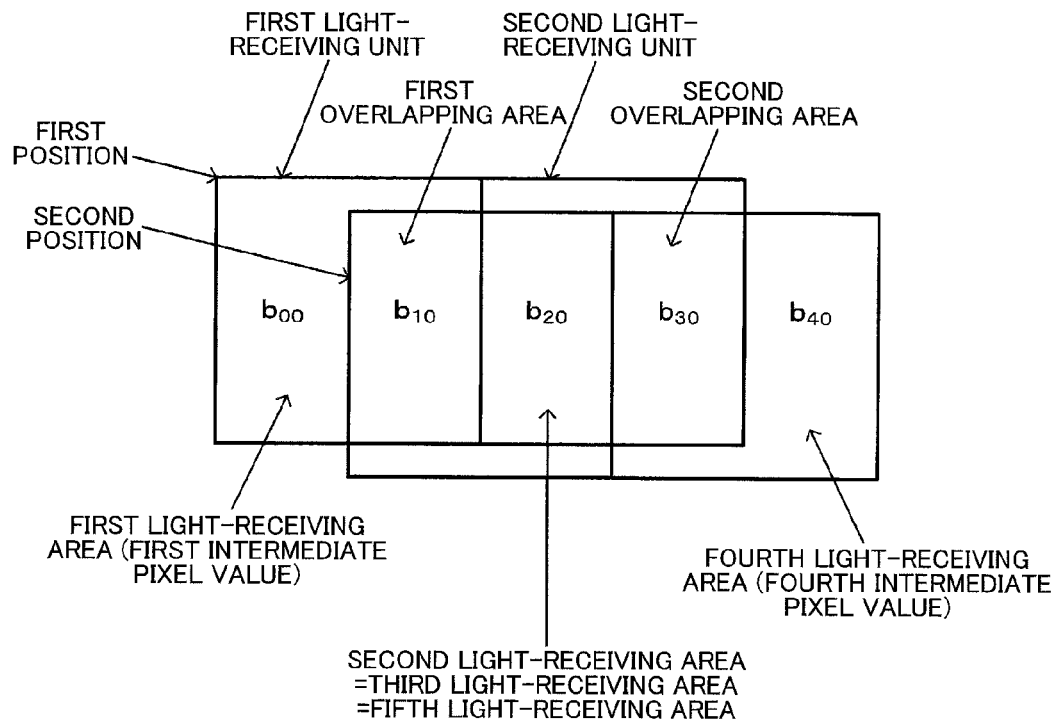
FIG. 17 is a view illustrating a third estimation method.

According to the third estimation method, a first light-receiving unit and a second light-receiving unit are adjacent to each other (see FIG. 17). The first light-receiving unit and the second light-receiving unit are sequentially set at a first position and a second position subsequent to the first position using the pixel shift process. The first light-receiving unit set at the first position and the first light-receiving unit set at the second position overlap each other in a first overlapping area, and the second light-receiving unit set at the first position and the second light-receiving unit set at the second position overlap each other in a second overlapping area.

An area obtained by removing the first overlapping area from the first light-receiving unit set at the first position is a first light-receiving area. An area obtained by removing the first overlapping area from the first light-receiving unit set at the second position is a second light-receiving area. A first intermediate pixel value pattern ($\phi_0=\{b_{00}, b_{10}, b_{20}\}$) that includes consecutive intermediate pixel values including a first intermediate pixel value and a second intermediate pixel value (e.g., $b_{00}$ and $b_{20}$) (i.e., the light-receiving value of the first light-receiving area and the light-receiving value of the second light-receiving area) is estimated.

An area obtained by removing the second overlapping area from the second light-receiving unit set at the first position is a third light-receiving area. An area obtained by removing the second overlapping area from the second light-receiving unit set at the second position is a fourth light-receiving area. A second intermediate pixel value pattern $\phi_2=\{b_{20}, b_{30}, b_{40}\}$) that includes consecutive intermediate pixel values including a third intermediate pixel value and a fourth intermediate pixel value (e.g., $b_{20}$ and $b_{40}$) (i.e., the light-receiving value of the third light-receiving area and the light-receiving value of the fourth light-receiving area) is estimated.

The overlapping area of the first light-receiving unit set at the second position and the second light-receiving unit set at the first position is a fifth light-receiving area. A third intermediate pixel value pattern $\phi_1=\{b_{10}, b_{20}, b_{30}\}$) that includes consecutive intermediate pixel values that include a fifth intermediate pixel value ($b_{20}$) (i.e., the light-receiving value of the fifth light-receiving area), and do not include the first intermediate pixel value and the fourth intermediate pixel value ($b_{00}$, $b_{40}$) is estimated.

The second light-receiving area, the third light-receiving area, and the fifth light-receiving area correspond to an identical light-receiving area. The intermediate pixel value ($b_{20}$) of the identical light-receiving area is determined based on the second intermediate pixel value, the third intermediate pixel value, and the fifth intermediate pixel value ($b_{20}$) obtained by estimating the first intermediate pixel value pattern, the second intermediate pixel value pattern, and the third intermediate pixel value pattern ($\phi_0$, $\phi_2$, $\phi_1$).

This makes it possible to estimate the pixel value with high accuracy. Specifically, the final pixel value can be determined based on three (a plurality of) estimated values obtained by three (a plurality of) estimation calculations. For example, a pixel value estimation process that is in conformity with the pixel value pattern of the actual image can be implemented by utilizing the determination method using a known image.

5. Fourth Estimation Method

Figure 18:
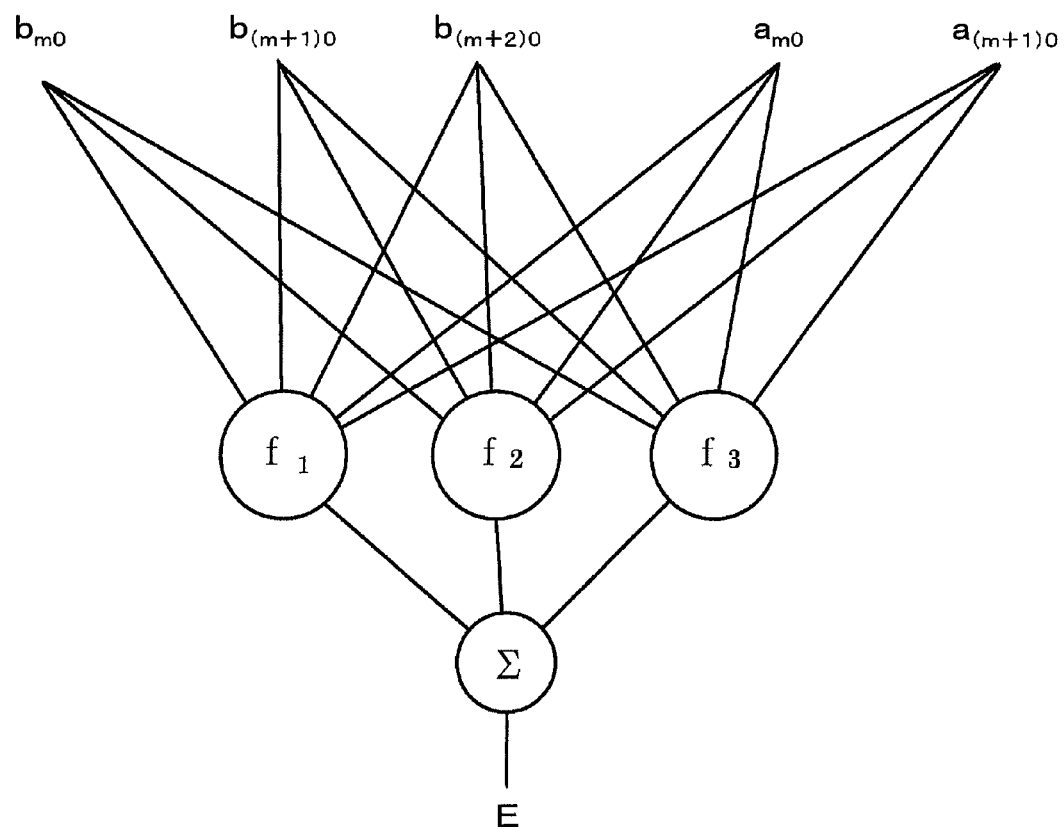
FIG. 18 is a view illustrating a fourth estimation method.

Although an example in which the pixel value is estimated using the least-square method has been described above, the pixel value may be estimated using a neural network (nonlinear estimation method). A fourth estimation method that utilizes a neural network is described below with reference to FIG. 18. The following description illustrates an example in which the intermediate pixel value (e.g., $b_{00}$) is estimated. Note that the estimated pixel value (e.g., $v_{00}$) can also be estimated by the following method.

In the fourth estimation method, the pixel values of a known high-resolution image are added up to calculate the light-receiving values $\{a_{m0}, a_{(m+1)0}\}$ and the intermediate pixel value pattern $\phi_m=\{b_{m0}, b_{(m+1)0}, b_{(m+2)0}\}$ corresponding to the light-receiving values (m is an integer equal to or larger than 0). A weighting coefficient W is calculated in advance by neural network learning computation (FIG. 18) using the above values as learning data. More specifically, the weighting coefficient W is calculated so that an error evaluation value E shown by the following expression (18) becomes zero (including approximately zero (given value in a broad sense). A common neural network learning method may be used.

The intermediate pixel value is estimated from the shot image using the weighting coefficient W calculated in advance. More specifically, a relational expression between the intermediate pixel values is obtained by the method described using the expression (2), for example, and an intermediate pixel value $b_{m0}$ ($=\alpha$) at which the error evaluation value E (see the expression (18)) becomes a minimum is calculated while changing the unknown ($b_{m0}$).

$$\begin{pmatrix} f_1 \\ f_2 \\ f_3 \end{pmatrix} = \begin{pmatrix} W_{11} & W_{12} & W_{13} & W_{14} & W_{15} \\ W_{21} & W_{22} & W_{23} & W_{24} & W_{25} \\ W_{31} & W_{32} & W_{33} & W_{34} & W_{35} \end{pmatrix} \begin{pmatrix} b_{m0} \\ b_{(m+1)0} \\ b_{(m+2)0} \\ a_{m0} \\ a_{(m+1)0} \end{pmatrix} \quad (18)$$

$$E = W_{41}f_1 + W_{42}f_2 + W_{43}f_3$$

According to the fourth estimation method, the relationship between the light-receiving values $\{a_{m0}, a_{(m+1)0}\}$ of the light-receiving units and the intermediate pixel value pattern $\phi_m = \{b_{m0}, b_{(m+1)0}, b_{(m+2)0}\}$ is acquired based on a known high-resolution frame image as prior information that specifies the similarity between the light-receiving values of the light-receiving units and the intermediate pixel value pattern in advance. The similarity between the intermediate pixel value pattern $\phi_m = \{b_{m0}, b_{(m+1)0}, b_{(m+2)0}\}$ expressed by the relational expression between the intermediate pixel values and the light-receiving values $\{a_{m0}, a_{(m+1)0}\}$ of the light-receiving units is evaluated based on the acquired prior information.

According to this configuration, since the similarity is evaluated based on the prior information that is acquired based on a known high-resolution frame image, the pixel value can be estimated while reflecting image information (e.g., spatial frequency characteristics) included in the known image (e.g., natural image).

According to the fourth estimation method, the image processing device includes a neural network. The neural network utilizes the node weighting coefficient W obtained by learning based on a known high-resolution frame image as the prior information. The neural network receives the intermediate pixel value pattern $\phi_m = \{b_{m0}, b_{(m+1)0}, b_{(m+2)0}\}$ and the light-receiving values $\{a_{m0}, a_{(m+1)0}\}$ of the light-receiving units, and outputs the similarity evaluation result E. The intermediate pixel values of the intermediate pixel value pattern $\phi_m = \{b_{m0}, b_{(m+1)0}, b_{(m+2)0}\}$ are determined based the similarity evaluation result E output from the neural network.

This makes it possible to evaluate the similarity between the intermediate pixel value pattern and the light-receiving values of the light-receiving units based on the prior information using the neural network that utilizes the node weighting coefficient W obtained by learning.

According to the third estimation method, an intermediate pixel value pattern having high occurrence probability with respect to the light-receiving value pattern is calculated as the prior information (third determination method). Alternatively, the occurrence probability distribution of the intermediate pixel value $b_{20}$ with respect to the degree-of-change combination pattern $\xi = \{\delta i_0, \delta i_1, \delta i_2\}$ may be calculated as the prior information (fourth determination method).

This makes it possible to estimate the pixel value using the occurrence probability distribution of the pixel value as the prior information. Therefore, a pixel value with high occurrence probability in a known image (e.g., natural image) can be used as the estimated value.

6. Adaptive Noise Reduction Process

Figure 19:
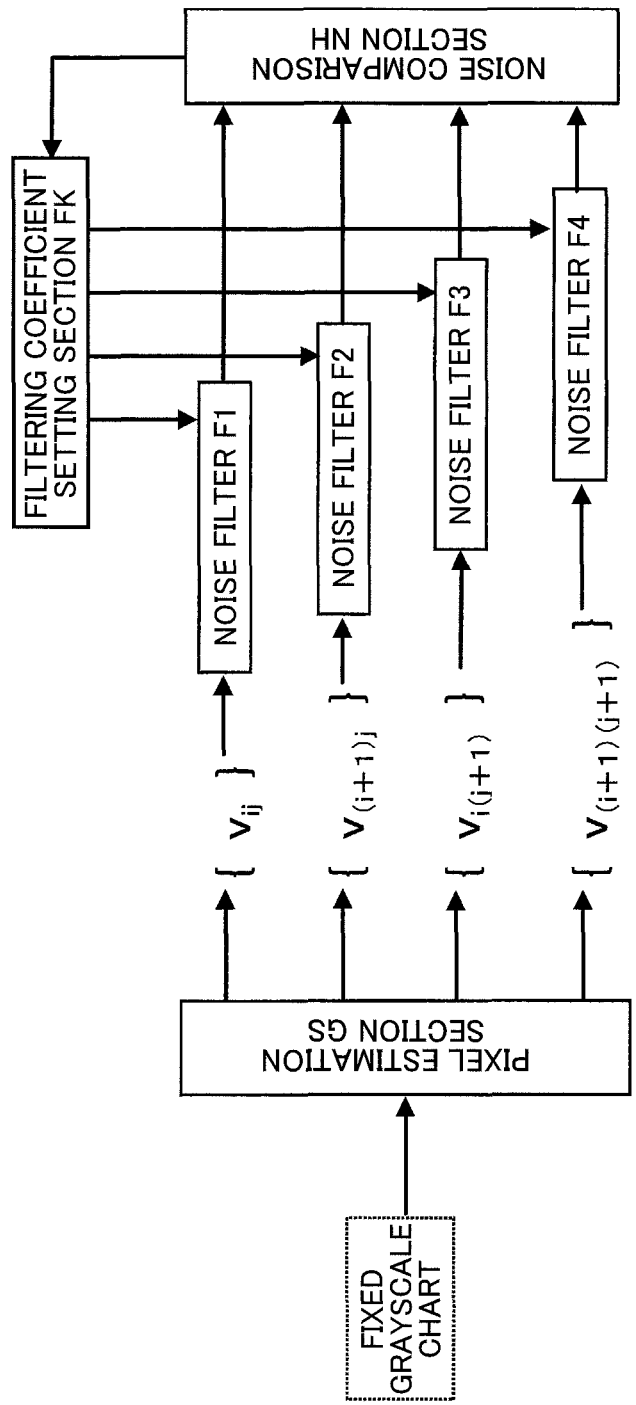
FIG. 19 illustrates a configuration example of a noise filter.

In one embodiment of the invention, a noise filtering process (filtering process in a broad sense) corresponding to the pixel position (e.g., the pixel position within the light-receiving unit) may be performed on the estimated pixel value $v_{ij}$. FIG. 19 illustrates a configuration example of a noise filter.

For example, when performing the pixel estimation process by overlap shift sampling using a four-pixel addition process, noise occurs in a different way depending on the positions of the final estimated pixels $v_{ij}$ to $v_{(i+1)(j+1)}$. As illustrated in FIG. 19, a solid image having a fixed grayscale (fixed grayscale chart) is shot, and the estimation process is performed on the shot image. The final estimated pixels $v_{ij}$ to $v_{(i+1)(j+1)}$ that differ in position are compared using a noise comparison section NH. A filtering coefficient setting section FK sets a filtering coefficient based on the comparison results so as to increase the noise reduction effect of a noise filter (F1 to F4) corresponding to the pixel position at which a large amount of noise occurs. Specifically, the filtering coefficient is set so that noise occurs in an identical (almost identical) way independently of the positions of the final estimated pixels $v_{ij}$ to $v_{(i+1)(j+1)}$. The image quality of the estimated pixel image can be improved by performing the filtering process while setting the filtering coefficient as described above.

According to the above noise filtering process, the filtering process is performed on the estimated pixel values $v_{ij}$ to $v_{(i+1)(j+1)}$ using a different filtering coefficient depending on the pixel position within the light-receiving unit.

Therefore, even if noise occurs in a different way depending on the pixel position within the light-receiving unit, noise can be reduced by performing the noise filtering process corresponding to the pixel position within the light-receiving unit.

7. Fifth Estimation Method

Weighted Summation of Pixel Values

Although an example in which the pixel values within the light-receiving unit are simply added up and read has been described above, the pixel values within the light-receiving unit may be subjected to a weighted summation process and read, and the estimated pixel values may be calculated from the light-receiving values. A fifth estimation method that utilizes the weighted summation process is described below with reference to FIGS. 20 to 28.

Figure 20:
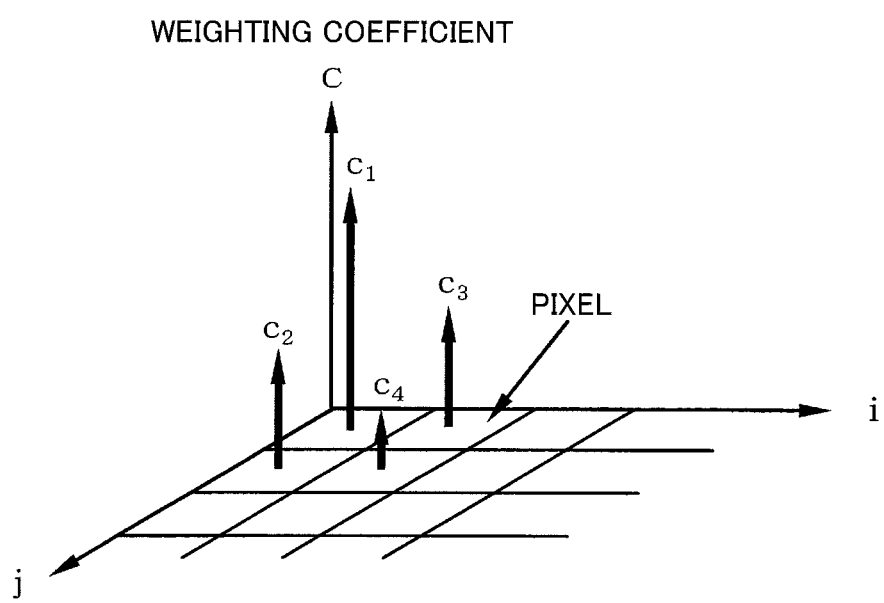
FIG. 20 is a view illustrating a weighting coefficient according to a fifth estimation method.

As illustrated in FIG. 20, weighting coefficients used for the addition readout process are referred to as $c_1$, $c_2$, $c_3$, and $c_4$. When $c_1=1$, the weighting coefficients have a relationship shown by the following expression (19) (r is a real number larger than 1).

$$c_1=1, c_2=1/r, c_3=1/r, c_4=1/r^2 \quad (19)$$

The following description illustrates an example in which r=2 (see the following expression (20)) for convenience of explanation.

$$c_1=1, c_2=1/2, c_3=1/2, c_4=1/4 \quad (20)$$

Figure 21A:
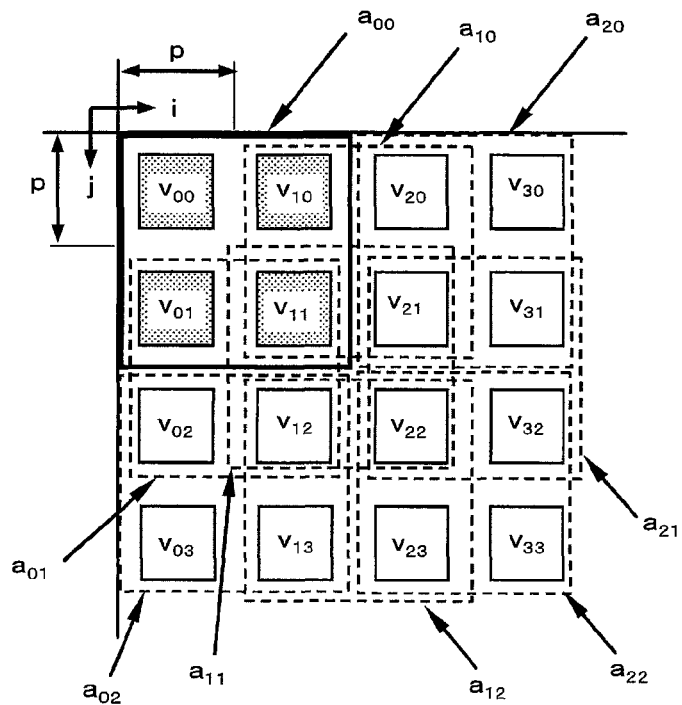
FIGS. 21A and 21B are views illustrating an intermediate pixel value estimation method according to a fifth estimation method.
Figure 21B:
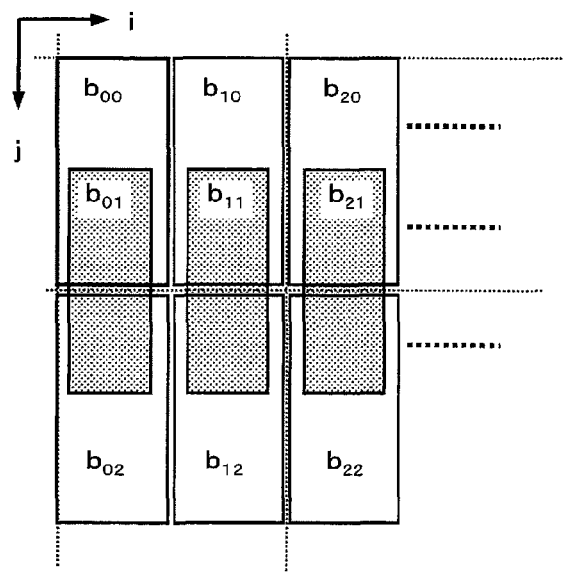

As illustrated in FIG. 21A, weighted-sum pixel values in the first row (horizontal direction) detected by weighted summation overlap shift sampling are referred to as $a_{00}$, $a_{10}$, and $a_{20}$. In this case, the following expression (21) is satisfied.

$$a_{00}=c_1 v_{00}+c_2 v_{01}+c_3 v_{10}+c_4 v_{11}$$

$$a_{10}=c_1 v_{10}+c_2 v_{11}+c_3 v_{20}+c_4 v_{21} \quad (21)$$

$b_{00}$, $b_{10}$, and $b_{20}$ are defined as shown by the following expression (22), and the expression (20) is substituted into the expression (22).

$$b_{00}=c_1 v_{00}+c_2 v_{01}=v_{00}+(1/2)v_{01}$$

$$b_{10}=c_1 v_{10}+c_2 v_{11}=v_{10}+(1/2)v_{11}$$

$$b_{20}=c_1 v_{20}+c_2 v_{21}=v_{20}+(1/2)v_{21} \quad (22)$$

Transforming the expression (21) using the expressions (20) and (22) yields the following expression (23).

$$a_{00}=v_{00}+(\tfrac{1}{2})v_{01}+(\tfrac{1}{2})v_{10}+(\tfrac{1}{4})v_{11}=b_{00}+(\tfrac{1}{2})b_{10}$$

$$a_{10}=v_{10}+(\tfrac{1}{2})v_{11}+(\tfrac{1}{2})v_{20}+(\tfrac{1}{4})v_{21}=b_{10}+(\tfrac{1}{2})b_{20} \quad (23)$$

Multiplying the pixel values $a_{00}$ and $a_{10}$ in the expression (23) by a given coefficient (given weighting coefficient), calculating the difference $\delta i_0$, and transforming the expression using the expression (22) yield the following expression (24).

$$\delta i_0 = a_{10} - 2a_{00} \quad (24)$$
$$= (1/2)v_{20} + (1/4)v_{21} - (2v_{00} + v_{01})$$
$$= (1/2)b_{20} - 2b_{00}$$

The intermediate pixel values $b_{10}$ and $b_{20}$ can be calculated as a function of the intermediate pixel value $b_{00}$ provided that the intermediate pixel value $b_{00}$ is an unknown (see the following expression (25)).

$$b_{00}=(\text{unknown}),$$
$$b_{10}=2(a_{00}-b_{00}),$$
$$b_{20}=4b_{00}+2\delta i_0=4b_{00}+2(a_{10}-2a_{00}) \quad (25)$$

A combination pattern of the high-resolution intermediate pixel values $\{b_{00}, b_{10}, \text{ and } b_{20}\}$ is thus calculated provided that the intermediate pixel value $b_{00}$ is an unknown (initial variable). Likewise, a combination pattern of the intermediate pixel values $\{b_{01}, b_{11}, \text{ and } b_{21}\}$ (second row) and a combination pattern of the intermediate pixel values $\{b_{02}, b_{12}, \text{ and } b_{22}\}$ (third row) are calculated provided that the intermediate pixel value $b_{01}$ or $b_{02}$ is an unknown.

Figure 22:
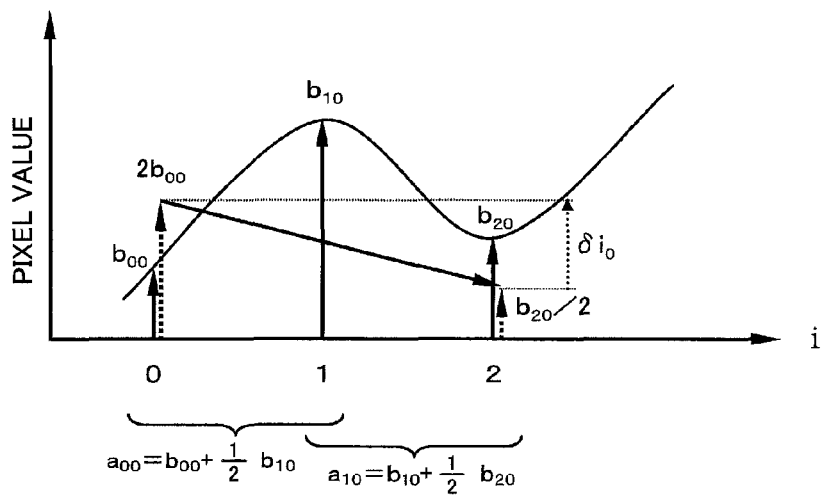
FIG. 22 is a view illustrating an intermediate pixel value estimation method according to a fifth estimation method.
Figure 23:
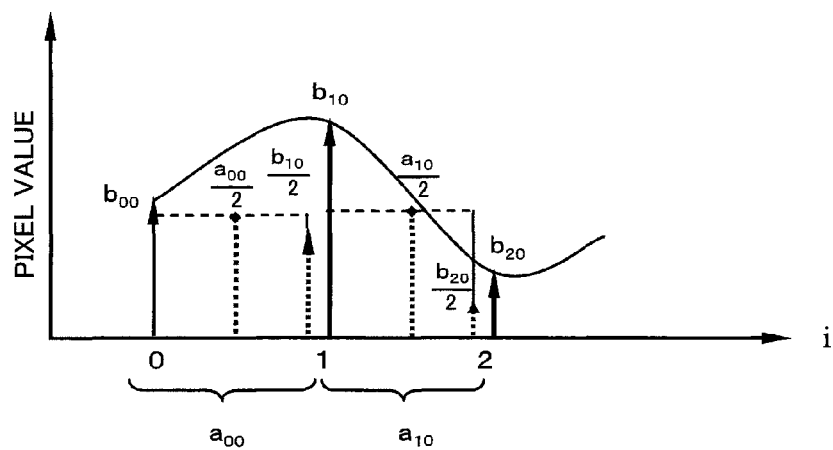
FIG. 23 is a view illustrating an intermediate pixel value estimation method according to a fifth estimation method.
Figure 24:
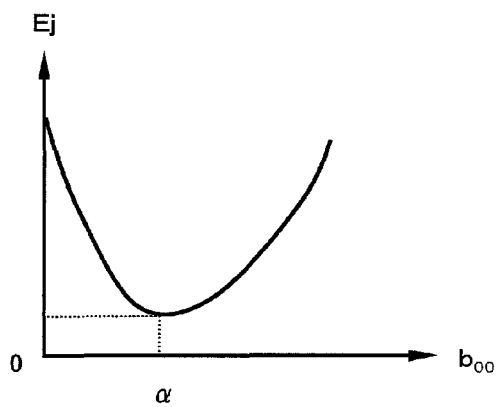
FIG. 24 is a view illustrating an intermediate pixel value estimation method according to a fifth estimation method.
Figure 25A:
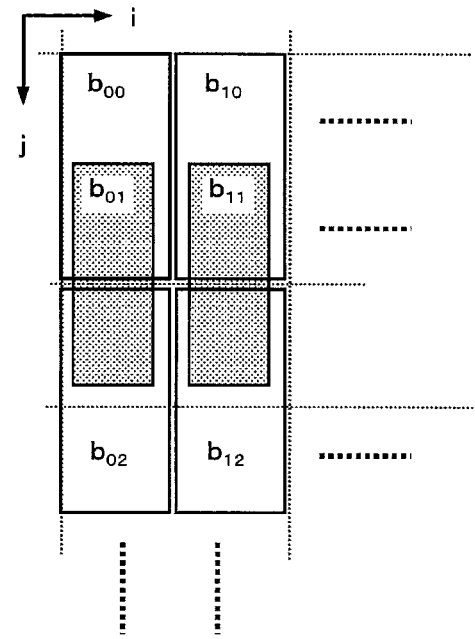
FIGS. 25A and 25B are views illustrating an estimated pixel value estimation method according to a fifth estimation method.
Figure 25B:
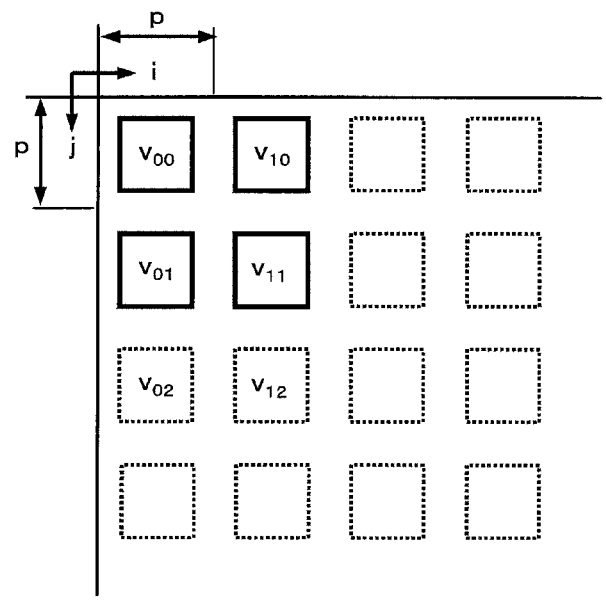

The unknown ($b_{00}$) is calculated as described below. As illustrated in FIG. 22, the pixel value pattern $\{a_{00}, a_{10}\}$ detected by weighted overlap shift sampling is compared with the intermediate pixel value pattern $\{b_{00}, b_{10}, b_{20}\}$. An unknown ($b_{00}$) that minimizes the error E is derived, and set as the intermediate pixel value $b_{00}$.

The sampling pixel values $\{a_{00}, a_{10}\}$ are the sum of adjacent values among the intermediate pixel values $\{b_{00}, b_{10}, b_{20}\}$ that are weighted using a different weighting coefficient (see the expression (23)). Therefore, a correct estimated value cannot be obtained when these values are merely compared. In order to deal with this problem, these values are compared after weighting the intermediate pixel values (see FIG. 23). More specifically, since the intermediate pixel values $\{b_{ij}, b_{(i+1)j}\}$ are weighted using $c_3=c_1/2$ and $c_4=c_2/2$, the following expression (26) is satisfied.

$$a_{ij}=b_{ij}+(\tfrac{1}{2})b_{(i+1)j} \quad (26)$$

The evaluation function Ej shown by the following expression (27) is calculated taking account of the weighting shown by the expression (26). The similarity between the pattern $\{a_{00}, a_{10}\}$ and the estimated intermediate pixel values $\{b_{00}, b_{10}, b_{20}\}$ is evaluated using the evaluation function Ej.

$$e_{ij} = \left(\frac{a_{ij}}{2} - b_{ij}\right)^2 + \left(\frac{a_{ij}}{2} - \frac{b_{(i+1)j}}{2}\right)^2, \quad (27)$$

$$Ej = \sum_{i=0}^{1} e_{ij}$$

The evaluation function Ej is expressed by a function using the intermediate pixel value $b_{00}$ as an initial variable (see the expression (25)). Therefore, an unknown ($b_{00}$) (=α) that minimizes the value of the evaluation function Ej is calculated to determine the estimated intermediate pixel value $b_{00}$ (see FIG. 24). The estimated intermediate pixel value $b_{00}$ is substituted into the expression (25) to determine the intermediate pixel values $b_{10}$ and $b_{20}$. Since the range of the intermediate pixel value $b_{00}$ is $0 \leq b_{00} \leq a_{00}$, the minimum value of the evaluation function Ej is calculated within this range. Likewise, a combination pattern of the intermediate pixel values $\{b_{01}, b_{11}, \text{ and } b_{21}\}$ (second row) and a combination pattern of the intermediate pixel values $\{b_{02}, b_{12}, \text{ and } b_{22}\}$ (third row) are calculated provided that the intermediate pixel value $b_{01}$ or $b_{02}$ is an unknown.

Figure 26:
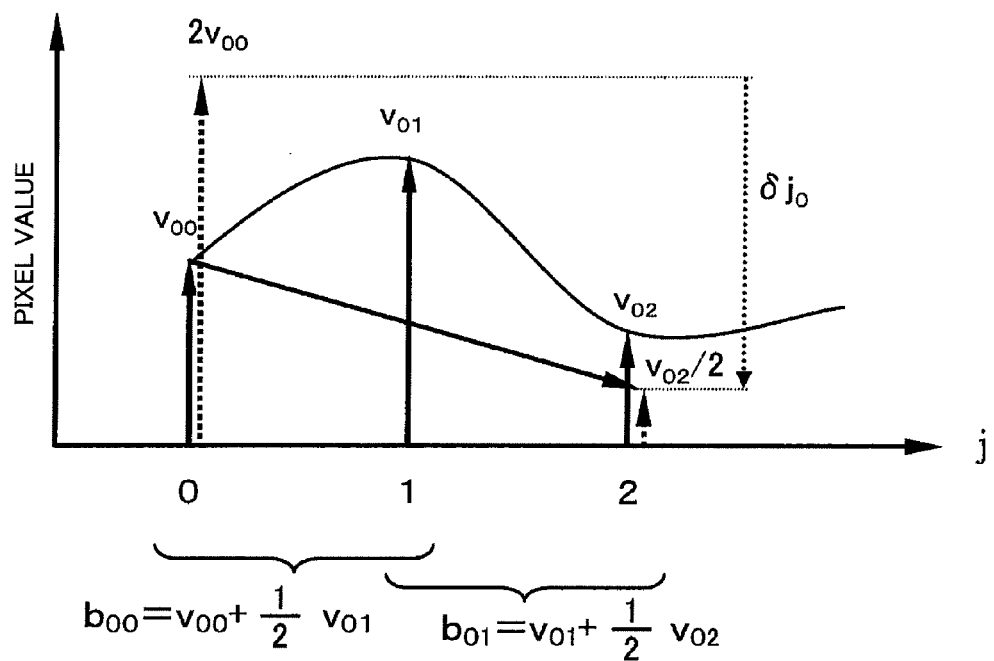
FIG. 26 is a view illustrating an estimated pixel value estimation method according to a fifth estimation method.

The final estimated pixel value $v_{ij}$ is calculated as described below using the calculated intermediate pixel value $b_{ij}$. The following description is given taking the left column (i=0) illustrated in FIGS. 25A and 25B as an example. As illustrated in FIG. 26, the intermediate pixel values $\{b_{01}, b_{01}, b_{02}\}$ and the final estimated pixel values $\{v_{00}, v_{01}, v_{02}\}$ have a relationship shown by the following expression (28).

$$b_{00}=c_1 v_{00}+c_2 v_{01}=v_{00}+(\tfrac{1}{2})v_{01},$$
$$b_{01}=c_1 v_{01}+c_2 v_{02}=v_{01}+(\tfrac{1}{2})v_{02} \quad (28)$$

Multiplying the intermediate pixel values $b_{00}$ and $b_{01}$ by a given coefficient, and calculating the difference $\delta j_0$ yield the following expression (29).

$$\delta j_0 = b_{01} - 2b_{00} \quad (29)$$
$$= (v_{01} + (1/2)v_{02}) - (2v_{00} + v_{01})$$
$$= (1/2)v_{02} - 2v_{00}$$

The final estimated pixel values $v_{01}$ and $v_{02}$ are calculated as a function of the estimated pixel value $v_{00}$ using the expressions (28) and (29) provided that the estimated pixel value $v_{00}$ is an unknown (initial variable). The function is shown by the following expression (30).

$$v_{00}=(\text{unknown}),$$
$$v_{01}=2(b_{00}-v_{00}),$$
$$v_{02}=4v_{00}+2\delta j_0=4v_{00}+2(b_{01}-2b_{00}) \quad (30)$$

The estimated pixel value pattern $\{v_{00}, v_{01}, v_{02}\}$ (see the expression (30)) is compared with the intermediate pixel value pattern $\{b_{00}, b_{01}\}$, and the unknown ($v_{00}$) is derived so that the error Ei becomes a minimum. Since the final estimated pixel values $\{v_{11}, v_{(i+1)j}\}$ are weighted using $c_2=c_1/2$, the following expression (31) is satisfied.

$$b_{ij}=v_{ij}+(\tfrac{1}{2})v_{i(j+1)} \quad (31)$$

Figure 27:
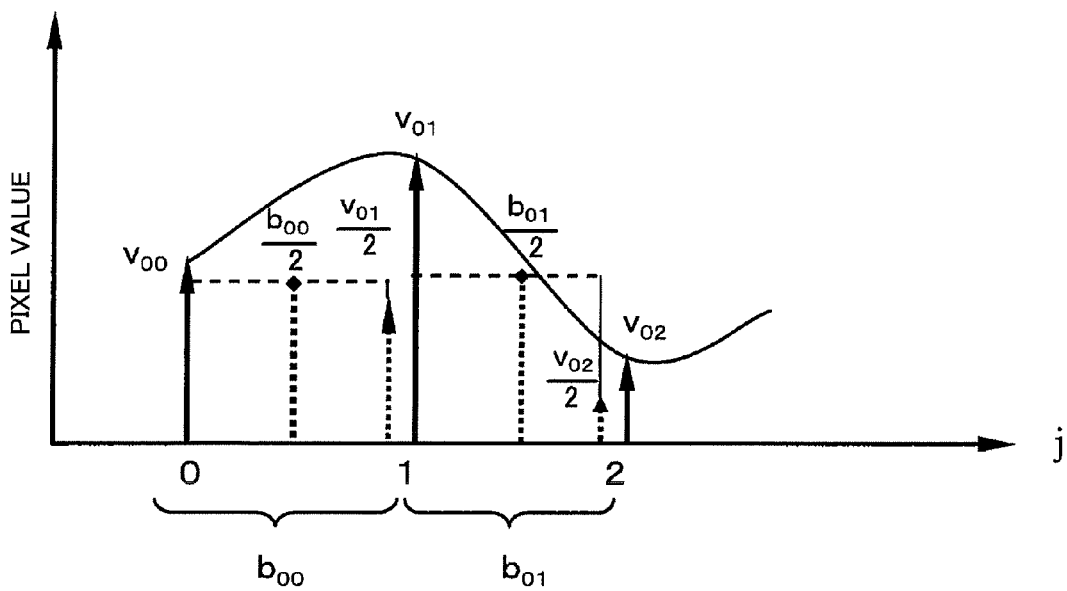
FIG. 27 is a view illustrating an estimated pixel value estimation method according to a fifth estimation method.
Figure 28:
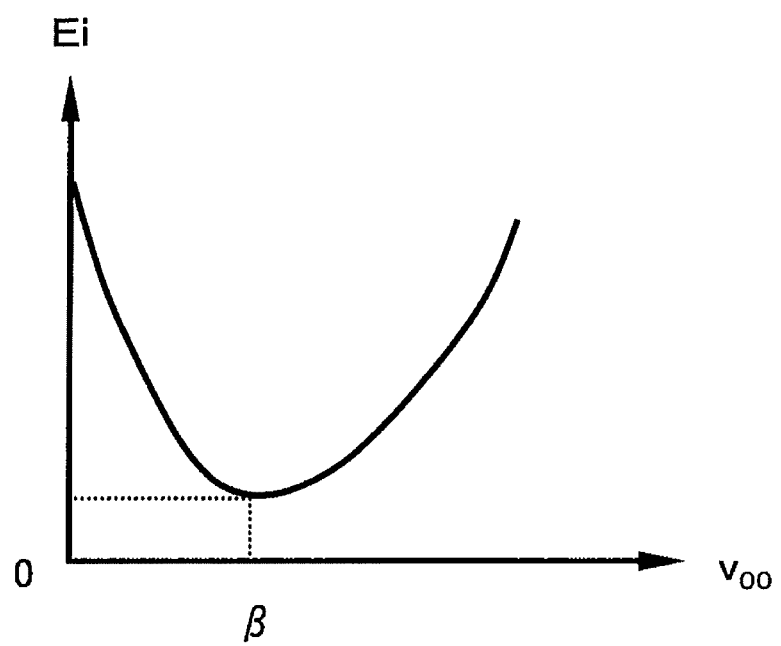
FIG. 28 is a view illustrating an estimated pixel value estimation method according to a fifth estimation method.

As illustrated in FIG. 27, the patterns are compared taking account of the weighting shown by the expression (31). More specifically, the evaluation function Ej shown by the following expression (32) is calculated.

$$e_{ij} = \left(\frac{b_{ij}}{2} - v_{ij}\right)^2 + \left(\frac{b_{ij}}{2} - \frac{v_{i(j+1)}}{2}\right)^2, \quad (32)$$

$$Ei = \sum_{j=0}^{1} e_{ij}$$

An unknown ($v_{00}$) (=β) at which the value of the evaluation function Ei becomes a minimum is calculated (see FIG. 28), and the estimated pixel value $v_{00}$ is substituted into the expression (30) to calculate the final estimated pixel values $v_{01}$ and $v_{02}$. Likewise, a combination pattern of the final estimated pixel values {$v_{10}$, $v_{11}$, $v_{12}$} (second row) is calculated provided that the estimated pixel value $v_{10}$ is an unknown.

According to the fifth estimation method, the pixel values (e.g., $v_{00}$, $v_{10}$, $v_{01}$, and $v_{11}$) of the light-receiving unit are subjected to the weighted summation process, and read as the light-receiving value ($a_{00}=v_{00}+(½)v_{01}+(½)v_{10}+(¼)v_{11}$) of the light-receiving unit. The pixel values ($v_{00}$, $v_{10}$, $v_{01}$, and $v_{11}$) of the pixels included in the light-receiving unit are estimated based on the light-receiving values ($a_{00}$, $a_{10}$) of the light-receiving units obtained by the weighted summation process.

This makes it possible to acquire a low-resolution frame image by subjecting the pixel values of the light-receiving unit to the weighted summation process, and estimate the pixel values of a high-resolution frame image from the acquired low-resolution frame image. This makes it possible to improve the reproducibility of the high-frequency component of the object when performing the estimation process. Specifically, when merely adding up the pixel values of the light-receiving unit, a rectangular window function is used for a convolution. On the other hand, when subjecting the pixel values of the light-receiving unit to the weighted summation process, a window function that contains a large amount of high-frequency component as compared with a rectangular window function is used for a convolution. This makes it possible to acquire a low-resolution frame image that contains a large amount of the high-frequency component of the object, and improve the reproducibility of the high-frequency component in the estimated image.

8. First Interpolation Method

Figure 29:
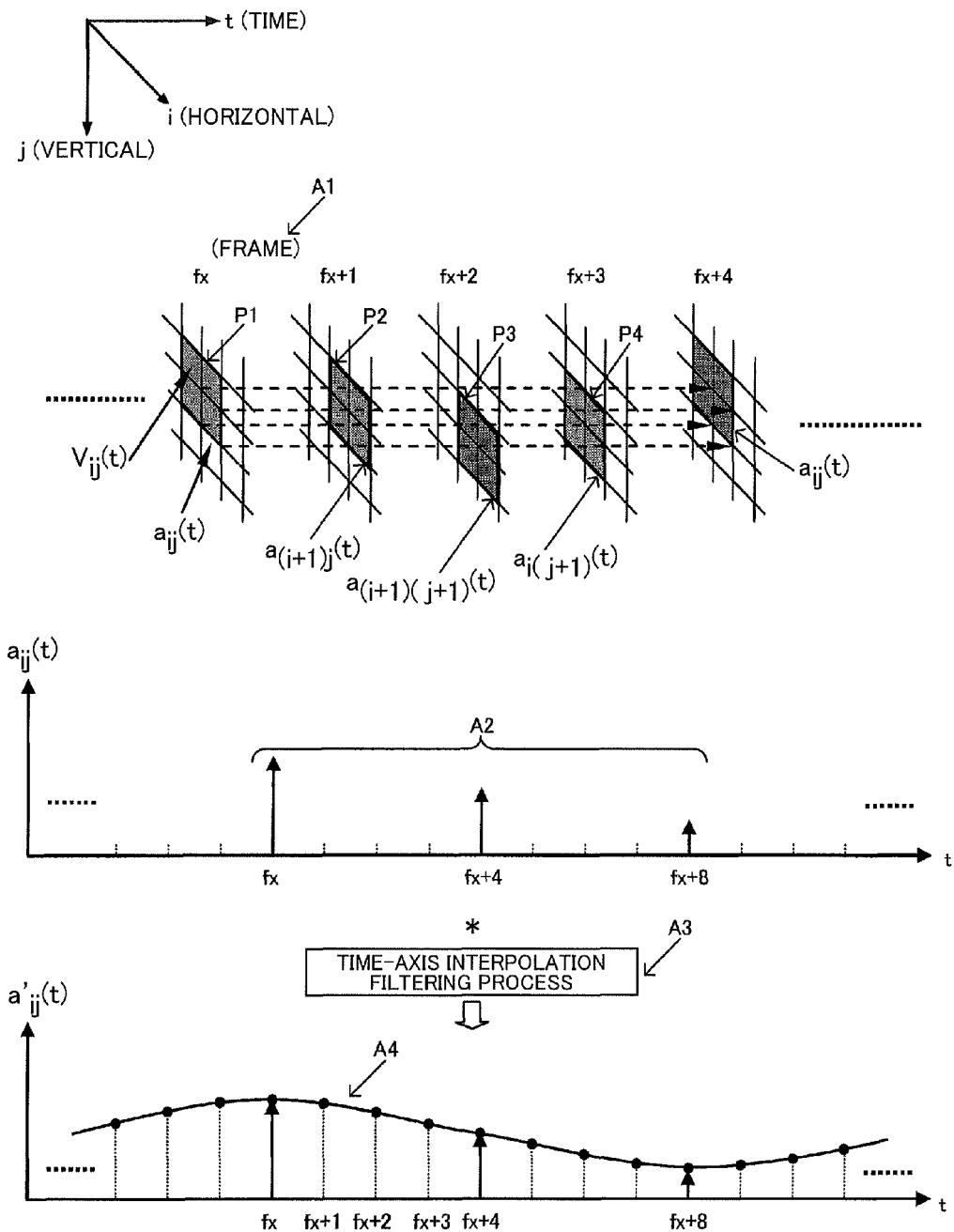
FIG. 29 is a view illustrating a first light-receiving value interpolation method.

In one embodiment of the invention, the light-receiving value obtained by the addition readout process may be used directly as the light-receiving value (e.g., $a_{00}$) used to estimate the pixel values, or a light-receiving value generated by an interpolation process may be used as the light-receiving value (e.g., $a_{00}$) used to estimate the pixel values. A light-receiving value interpolation method according to one embodiment of the invention is described below with reference to FIGS. 29 to 32. FIG. 29 is a view illustrating a first interpolation method.

Note that the term "frame" used herein refers to a timing at which one low-resolution frame image is captured by an image sensor, or a timing at which one low-resolution frame image is processed by image processing, for example. A low-resolution frame image or a high-resolution frame image included in image data may also be appropriately referred to as "frame".

In one embodiment of the invention, the light-receiving value in the interpolation target frame is interpolated using the light-receiving value acquired in another frame (time-axis interpolation process).

More specifically, the light-receiving values $a_{ij}$, $a_{(i+1)j}$, $a_{(i+1)(j+1)}$, and $a_{9(j+1)}$ are sequentially acquired in frames fx to fx+3 (see A1 in FIG. 29). The light-receiving value $a_{ij}$ is acquired again in a frame fx+4. For example, a low-resolution frame image having the light-receiving value $a_{ij}$ is acquired in the frames a, fx+4, and fx+8 (see A2). A time-axis interpolation filtering process (filtering process) is performed on the time-series data of the light-receiving value $a_{ij}$ (see A3). A light-receiving value $a'_{ij}$ is generated in each frame by performing the time-axis interpolation filtering process (see A4).

Each light-receiving value is acquired every four frames, and subjected to the time-axis interpolation filtering process to generate the light-receiving values $a'_{ij}$, $a'_{(i+1)j}$, $a'_{(i+1)(j+1)}$, and $a'_{i(j+1)}$ in each frame.

Figure 30:
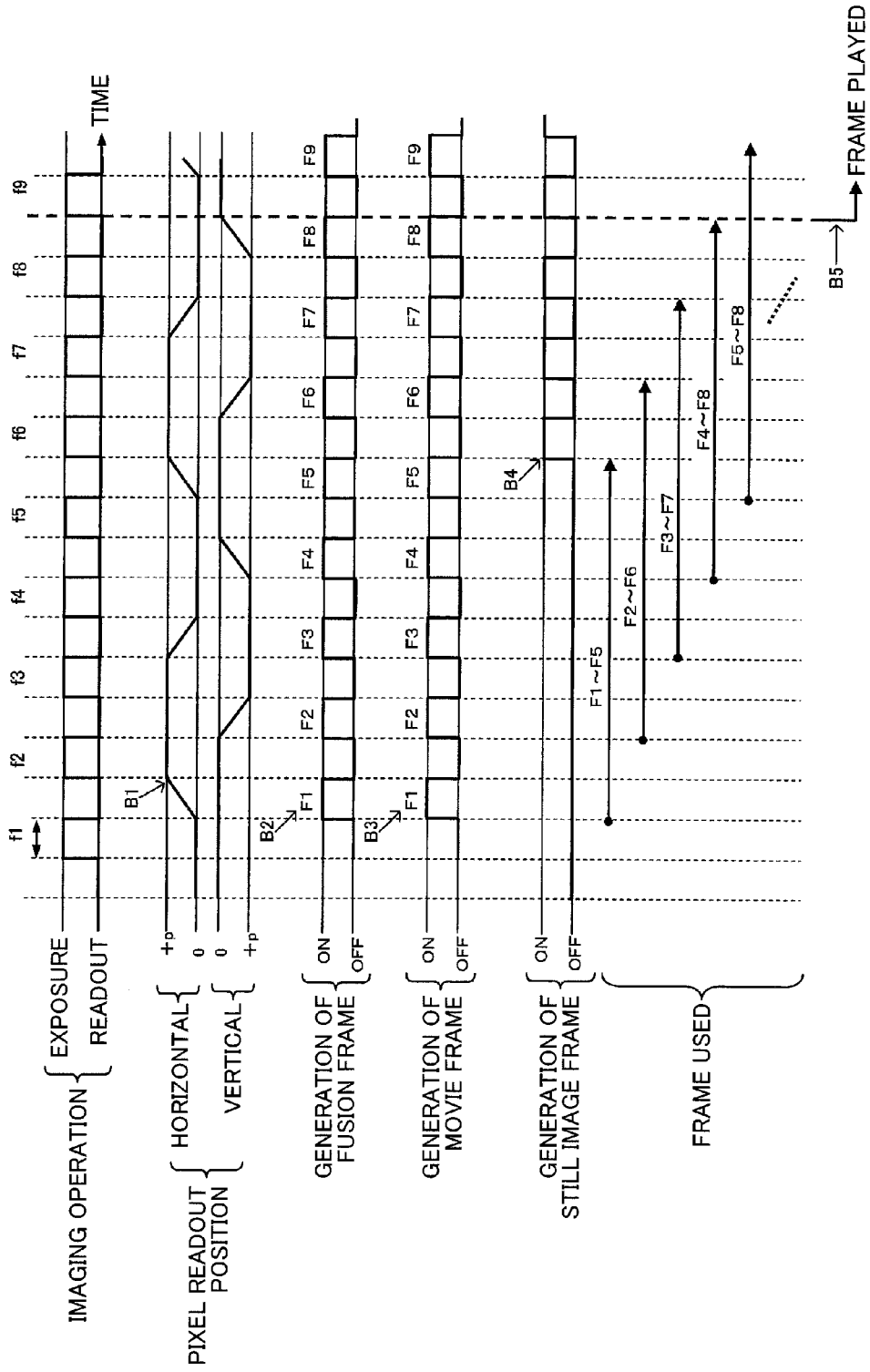
FIG. 30 illustrates an example of a timing chart of an interpolation process.

FIG. 30 illustrates an example of a timing chart of the interpolation process. As indicated by B1 in FIG. 30, the position of the light-receiving unit is shifted by one pixel in each frame. As indicated by B2, fusion frames F1, F2, . . . (low-resolution frame images) are shot in each frame. As indicated by B3, low-resolution movie frames are generated, and displayed as a live view, or recorded. As indicated by B4, the time-axis interpolation process is performed on the light-receiving value, and the pixel values are estimated using the light-receiving value obtained by the interpolation process to generate a high-resolution still image frame. As indicated by B5, a high-resolution still image or a high-resolution movie is output in the ninth frame (i.e., a frame after each light-receiving value has been subjected to the interpolation process).

Figure 31:
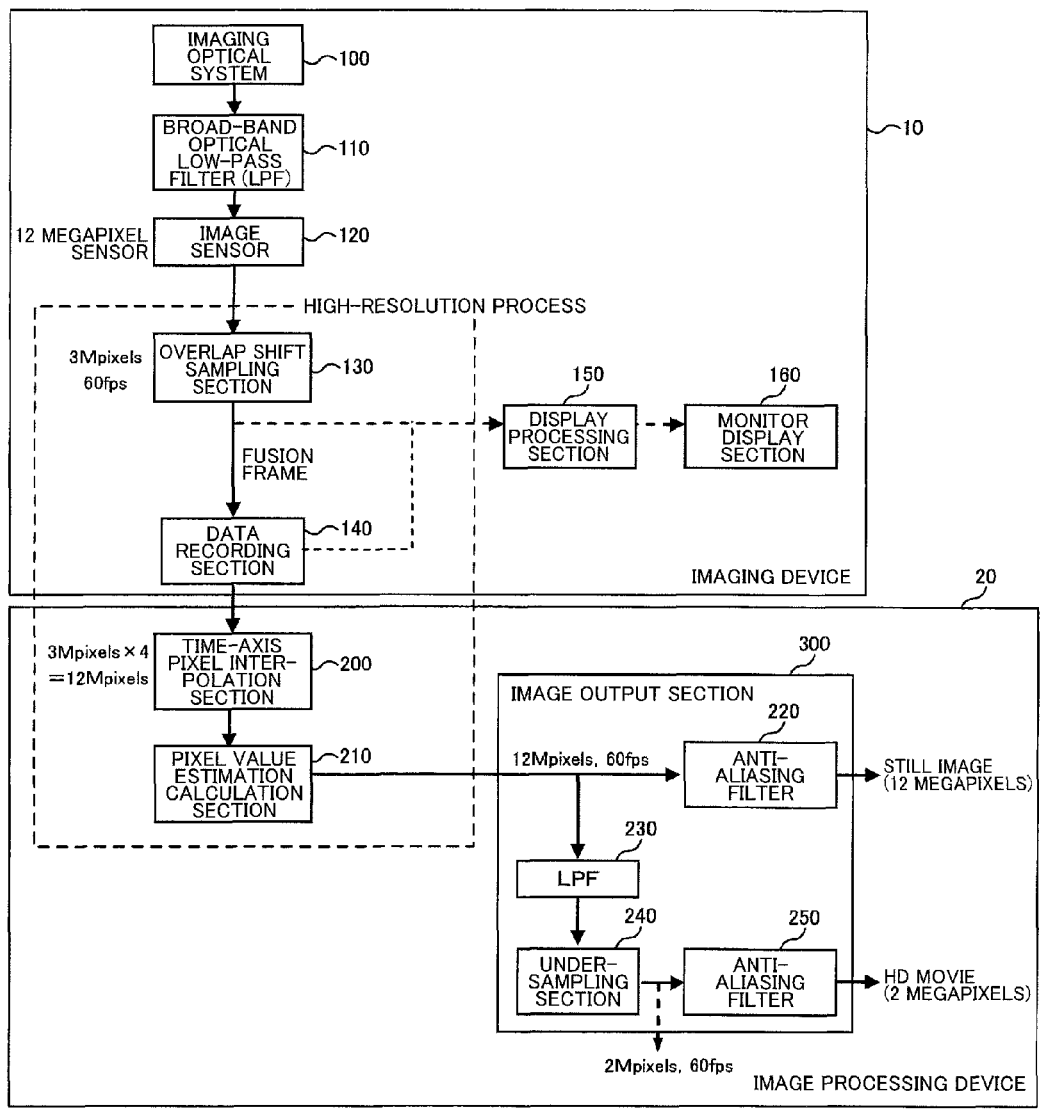
FIG. 31 illustrates a first specific configuration example of an imaging device and an image processing device.
Figure 32:
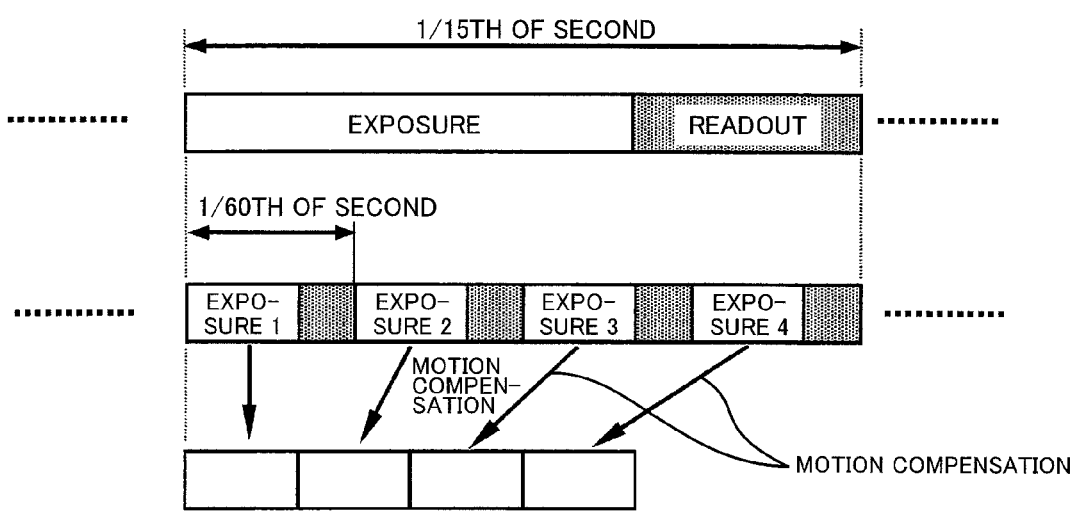
FIG. 32 illustrates a view illustrating a motion compensation process performed on a fusion frame.

FIG. 31 illustrates a first specific configuration example of an imaging device and an image processing device. An imaging device 10 illustrated in FIG. 31 includes an imaging optical system 100 (lens), an optical low-pass filter 110, an image sensor 120, an overlap shift sampling section 130 (readout control section), a data recording section 140 (storage section), a display processing section 150 (display control section), and a monitor display section 160 (display). The image processing device 20 includes a time-axis pixel interpolation section 200 (interpolation section), a pixel value estimation calculation section 210 (estimation section), and an image output section 300.

Note that the configuration of the imaging device and the image processing device according to one embodiment of the invention is not limited to the configuration illustrated in FIG. 31. Various modifications may be made, such as omitting some of the elements or adding other elements. Although FIG. 31 illustrates an example in which the image processing device 20 is provided outside the imaging device 10, the image processing device 20 may be provided inside the imaging device 10.

The imaging device 10 is a digital camera or a video camera, for example. The imaging optical system 100 forms an image of an object. The optical low-pass filter 110 allows a band corresponding to the resolution of the image sensor 120 to pass through, for example. The image sensor 120 (e.g., 12 megapixels) is a CCD or a CMOS sensor that implements an analog addition readout process, for example. The overlap shift sampling section 130 controls the light-receiving unit setting process and the addition readout process, and acquires a fusion frame (e.g., 3 megapixels), for example. The data recording section 140 is implemented by a memory card or the like, and records a movie formed by the fusion frames. The monitor display section 160 displays the movie as a live view, or displays the movie that is played.

The image processing device 20 is implemented by an image processing engine (IC) or a computer (PC), for example. The time-axis pixel interpolation section 200 performs the time-axis interpolation process on the light-receiving value of the fusion frame. The pixel value estimation calculation section 210 estimates the final estimated pixel value. The image output section 300 includes an anti-aliasing filters 220 and 250, a low-pass filter 230, and an undersampling section 240, and outputs a still image or a movie using the final estimated pixel value. The anti-aliasing filter 220 performs an anti-aliasing process on the final estimated pixel value, and outputs a high-resolution still image (e.g., 12 megapixels). The low-pass filter 230 limits the final estimated pixel value to a value within the High-Vision band. The under-sampling section 240 under-samples the band-limited final estimated pixel value to the number of pixels compliant to High-Vision. The anti-aliasing filter 220 performs an anti-aliasing process on the under-sampled image, and outputs a High-Vision movie (e.g., 2 megapixels). Note that a high-resolution movie (e.g., 12 megapixels) may be output without performing the under-sampling process.

Note that the interpolation process may be performed on the light-receiving value using a motion compensation process instead of performing the interpolation process on the light-receiving value using the time-axis filtering process. For example, a still image (i.e., a high-resolution image that is shot at a low frame rate (1/15th of a second)) may be generated by performing a motion compensation process on four consecutive fusion frames that have been shot at a high frame rate (1/60th of a second) (see FIG. 32).

Since the low-resolution frame images are sequentially acquired using the pixel shift process, four frames are required to acquire the light-receiving values used to estimate the pixel values. Therefore, when the acquired light-receiving values are directly used to estimate the pixel values, the image quality may deteriorate when the object moves since the light-receiving values in different frames are used to estimate the pixel values.

According to one embodiment of the invention, the pixel shift process is performed every frame (fx, fx+1, . . . ), and the light-receiving units are sequentially set at a plurality of positions (four positions (P1 to P4 in FIG. 29)) due to the pixel shift process. The light-receiving units are set at an identical position every multiple frames (every four frames). The light-receiving values $a_{ij}$ to $a_{(i+1)(j+1)}$ corresponding to the respective positions are thus acquired in time series, and low-resolution frame images are acquired in time series based on the acquired light-receiving values (consecutive low-resolution frame images).

A process that interpolates the light-receiving values $a'_{ij}$ to $a'_{(i+1)(j+1)}$ of the light-receiving units at the positions P1 to P4 is performed on the acquired consecutive low-resolution frame images. More specifically, the light-receiving value ($a'_{ij}$) of the light-receiving unit at the missing position (e.g., P1) in the consecutive low-resolution frame image in the interpolation target frame (e.g., fx+1) is interpolated by the time-axis interpolation process. That is, the light-receiving value ($a'_{ij}$) is interpolated by the time-axis interpolation process using the light-receiving values ($a_{ij}$) of the light-receiving units in the consecutive low-resolution frame images in the frames (fx and fx+4) that respectively precede or follow the interpolation target frame (fx+1).

The pixel value $v_{11}$ of each pixel of the light-receiving unit in each frame (fx, fx+1, . . . ) is estimated based on the consecutive low-resolution frame images subjected to the time-axis interpolation process.

This makes it possible to acquire the light-receiving values using the pixel shift process, interpolate the light-receiving value at the missing position using the acquired light-receiving values, and calculate the final estimated pixel values from the light-receiving value obtained by the interpolation process. Therefore, since the light-receiving value at each position can be interpolated in each frame, the pixel values can be estimated from the light-receiving values in the same frame, and a deterioration in image quality can be prevented even when the object makes a motion.

According to one embodiment of the invention, the time-axis interpolation process is performed using the time-axis interpolation filtering process.

This makes it possible to interpolate the light-receiving values ($a_{ij}$ in the frames fx and fx+4) at each position (e.g., P1) using the time-axis interpolation process, and generate the light-receiving values ($a'_{ij}$) at the missing position (P1 in the frames fx+1 to fx+3).

The image output section 300 generates a high-resolution frame image in each frame based on the final estimated pixel value in each frame estimated by the pixel value estimation calculation section 210, and outputs the generated high-resolution frame image as a still image or a movie.

This makes it possible to output a high-resolution still image at an arbitrary timing from the shot movie. This makes it possible to acquire a high-resolution still image at the best moment without aiming at the best shot.

9. Second Interpolation Method

In one embodiment of the invention, an adaptive light-receiving value interpolation process may be performed corresponding to the motion of the object. A second interpolation method that implements an adaptive light-receiving value interpolation process is described below with reference to FIGS. 33 and 34.

The second interpolation method applies the light-receiving value in the preceding or subsequent frame to the light-receiving value for which the amount of motion is zero or small, and interpolates (estimates) the light-receiving value from the adjacent light-receiving values in the same frame when the amount of motion is large. Since it is determined that a motion has occurred in each pixel when panning or the like has been performed, a motion compensation process may be performed in advance.

Figure 33:
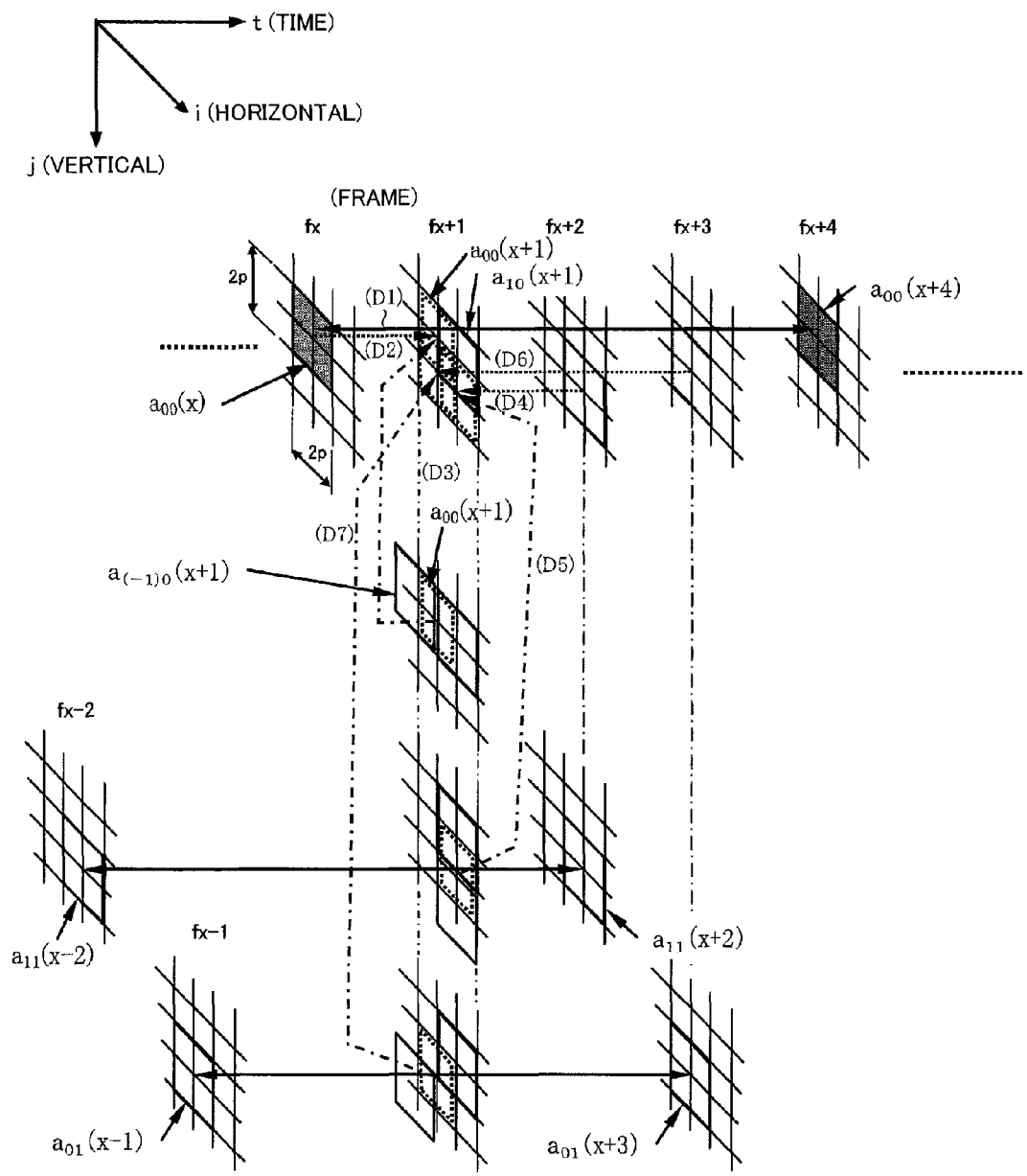
FIG. 33 is a view illustrating a second light-receiving value interpolation method.

The following description illustrates an example of generating a high-resolution still image in the low-resolution image frame fx+1 among the low-resolution image frames fx to fx+4 illustrated in FIG. 33. FIG. 34 illustrates some of the light-receiving values acquired as image data in the frame fx+1 for convenience of explanation. In FIG. 34, the acquired light-receiving values are indicated by $a_{10}(x+1)$, $a_{(-1)0}(x+1)$, $a_{(-1)2}(x+1)$, and $a_{12}(x+1)$.

As illustrated in FIG. 34, when calculating four high-resolution pixel values that correspond to the light-receiving value $a_{10}(x+1)$, it is necessary to calculate three light-receiving values $a_{00}(x+1)$, $a_{01}(x+1)$, and $a_{11}(x+1)$ that are shifted with respect to the light-receiving value $a_{10}(x+1)$ by a pixel pitch p using the interpolation process. These three light-receiving values are calculated as described below.

As indicated by D1 in FIG. 33, the light-receiving values $a_{00}(x)$ and $a_{00}(x+4)$ in the frames fx and fx+4 acquired at a position corresponding to the light-receiving value $a_{00}(x+1)$ are compared. When the difference between the light-receiving values $a_{00}(x)$ and $a_{00}(x+4)$ is smaller than a given threshold value $\delta$, it is determined that the object (part of the object that makes a motion) has not passed through the pixel position corresponding to the light-receiving value $a_{00}(x+1)$ between the frames fx and fx+4. In this case, the light-receiving value $a_{00}(x)$ or $a_{00}(x+4)$ is used as the light-receiving value $a_{00}(x+1)$ (see D2).

When the difference between the light-receiving values $a_{00}(x)$ and $a_{00}(x+4)$ is larger than the threshold value $\delta$, it is determined that the object has passed through the pixel position corresponding to the light-receiving value $a_{00}(x+1)$ between the frames fx and fx+4. In this case, an interpolated value is calculated using the light-receiving values $a_{10}(x+1)$ and $a_{(-1)0}(x+1)$ adjacent to the light-receiving value $a_{00}(x+1)$ in the same frame, and used as the light-receiving value $a_{00}(x+1)$. For example, the average value of the light-receiving values $a_{10}(x+1)$ and $a_{(-1)0}(x+1)$ is used as the light-receiving value $a_{00}(x+1)$. Note that the light-receiving value may be interpolated using three or more peripheral light-receiving values instead of using the average value of two adjacent light-receiving values.

The interpolation method for the light-receiving value $a_{00}(x+1)$ is shown by the following expression (33).

When $|a_{00}(x)-a_{00}(x+4)| \le \delta$, $a_{00}(x+1)=a_{00}(x)=a_{00}(x+4)$

When $|a_{00}(x)-a_{00}(x+4)| > \delta$, $a_{00}(x+1)=\{a_{10}(x+1)+a_{(-1)0}(x+1)\}/2$ (33)

Likewise, the light-receiving value $a_{11}(x+1)$ is interpolated as shown by the following expression (34) (see D4 and D5).

When $|a_{11}(x-2)-a_{11}(x+2)| \le \delta$, $a_{11}(x+1)=a_{11}(x-2)=a_{11}(x+2)$ When $|a_{11}(x-2)-a_{11}(x+2)| > \delta$, $a_{11}(x+1)=\{a_{10}(x+1)+a_{12}(x+1)\}/2$ (34)

The light-receiving value $a_{01}(x+1)$ is interpolated as shown by the following expression (35) (see D6 and D7).

When $|a_{01}(x-1)-a_{01}(x+3)| \le \delta$, $a_{01}(x+1)=a_{01}(x-1)=a_{01}(x+3)$ When $|a_{01}(x-1)-a_{01}(x+3)| > \delta$, $a_{01}(x+1)=\{a_{10}(x+1)+a_{(-1)2}(x+1)\}/2$ (35)

Note that the threshold value $\delta$ may be set to a value for appropriately evaluating the quality image. For example, the threshold value $\delta$ may be set so as to prevent a situation in which it is determined that a motion is present in a still image due to noise.

According to the second interpolation method, the difference $(a_{00}(x)-a_{00}(x+4))$ between the light-receiving values of the light-receiving units in the frames (e.g., fx and fx+4) that respectively precede or follow the interpolation target frame (e.g., fx+1) is calculated. When the difference is smaller than the threshold value $\delta$, the light-receiving value $(a_{00}(x+1))$ of the light-receiving unit at the missing position in the interpolation target frame (fx+1) is interpolated using the light-receiving value $(a_{00}(x)$ or $a_{00}(x+4))$ of the light-receiving unit at a position identical with the missing position in the frame (fx or fx+4) that precedes or follows the interpolation target frame. When the difference is larger than the threshold value $\delta$, the light-receiving value $(a_{00}(x+1))$ of the light-receiving unit at the missing position in the interpolation target frame (fx+1) is interpolated using the light-receiving values $(a_{10}(x+1)$ and $a_{(-1)0}(x+1))$ acquired in the interpolation target frame (fx+1).

This makes it possible to adaptively interpolate the light-receiving value corresponding to the motion of the object. More specifically, since the light-receiving value acquired at an identical position is used for the light-receiving unit in which the motion of the object is small, a positional error can be reduced. Since the light-receiving value acquired in the same frame is used for the light-receiving unit in which the motion of the object is large, a temporal error can be reduced. For example, the time when the object has passed through an arbitrary pixel position between the frames fx and fx+4 cannot be determined from the light-receiving values $a_{00}(x)$ and $a_{00}(x+4)$. Therefore, if the light-receiving value $a_{00}(x+1)$ is interpolated using the light-receiving values $a_{00}(x)$ and $a_{00}(x+4)$, the effect of the motion of the object occurs even at a timing that precedes the timing at which the object has passed through the pixel position. According to the second interpolation method, since the light-receiving value is interpolated using the light-receiving values at the same frame when it has been determined that the object has passed through the pixel position, it is possible to accurately reflect the timing at which the object has passed through the pixel position.

According to the second interpolation method, it is possible to prevent a deterioration in image quality due to erroneous motion detection. For example, when a change in brightness that exceeds the threshold value $\delta$ has occurred during a period in which four frames are shot, the change in brightness may be erroneously detected as a motion of the object. According to the second interpolation method, since the interpolation method is merely changed to the intraframe interpolation method even when erroneous detection has occurred, a significant deterioration in image quality can be prevented.

10. First Color Image Estimation Method

Although an example when estimating the pixel values of a monochromatic image has been described above, the embodiments of the invention may also be applied when estimating the pixel values of a color image. A first color image estimation method is described below with reference to FIG. 35.

The first color image estimation method performs the addition readout process without separating the RGB pixels, and estimates the final RGB pixel values. As illustrated in FIG. 35, the light-receiving values $a_{00}$, $a_{10}$, $a_{01}$, and $a_{11}$ (see the following expression (36)) are sequentially acquired in frames fk+0 to fk+3, for example.

$a_{00}=R_{10}+G1_{00}+G2_{11}+B_{01}$, $a_{10}=R_{10}+G1_{20}+G2_{11}+B_{21}$, $a_{01}=R_{12}+G1_{02}+G2_{11}+B_{01}$, $a_{11}=R_{12}+G1_{22}+G2_{11}+B_{21}$ (36)

The pixel values $v_{00}$, $v_{10}$, $v_{01}$, and $v_{11}$ are estimated based on these light-receiving values using an estimation method similar to the estimation method described with reference to FIG. 2A, for example. Since the relationship between the estimated pixel values and RGB is known, the RGB estimated pixel values $G1_{00}=v_{00}$, $R_{10}=v_{10}$, $B_{01}=v_{01}$, and $G2_{11}=v_{11}$ can be calculated.

According to the first color image estimation method, the image sensor is a color image sensor (single-chip RGB image sensor), and a plurality of adjacent pixels (e.g., $G1_{00}$, $R_{10}$, $B_{01}$, and $G2_{11}$) are set as the light-receiving unit independently of the color of each pixel. The pixel values of the plurality of adjacent pixels set as the light-receiving unit are added up, and read $(a_{00}=G1_{00}+R_{10}+B_{01}+G2_{11})$ to acquire a low-resolution frame image. The pixel values ($G1_{00}$, $R_{10}$, $B_{01}$, and $G2_{11}$) of the pixels of the light-receiving unit are estimated based on the acquired low-resolution frame image, and a color high-resolution frame image (still image or movie) is output based on the estimated pixel values.

This makes it possible to shoot a color low-resolution frame image at a high frame rate, and estimate the pixel values from the low-resolution frame image to acquire a color high-resolution frame image at an arbitrary timing. Since the light-receiving value is acquired by adding up the pixel values of four adjacent pixels, random noise can be reduced. Moreover, since the readout pixels are positioned close to each other, it is possible to use peripheral pixels having a high correlation when implementing the intraframe pixel interpolation process used in the second interpolation method.

11. Second Estimation Method for Color Image

The addition readout process may be performed while separating the RGB pixels, and the final RGB pixel values may be estimated. A second color image estimation method is described below with reference to FIGS. 36 to 39.

Figure 36:
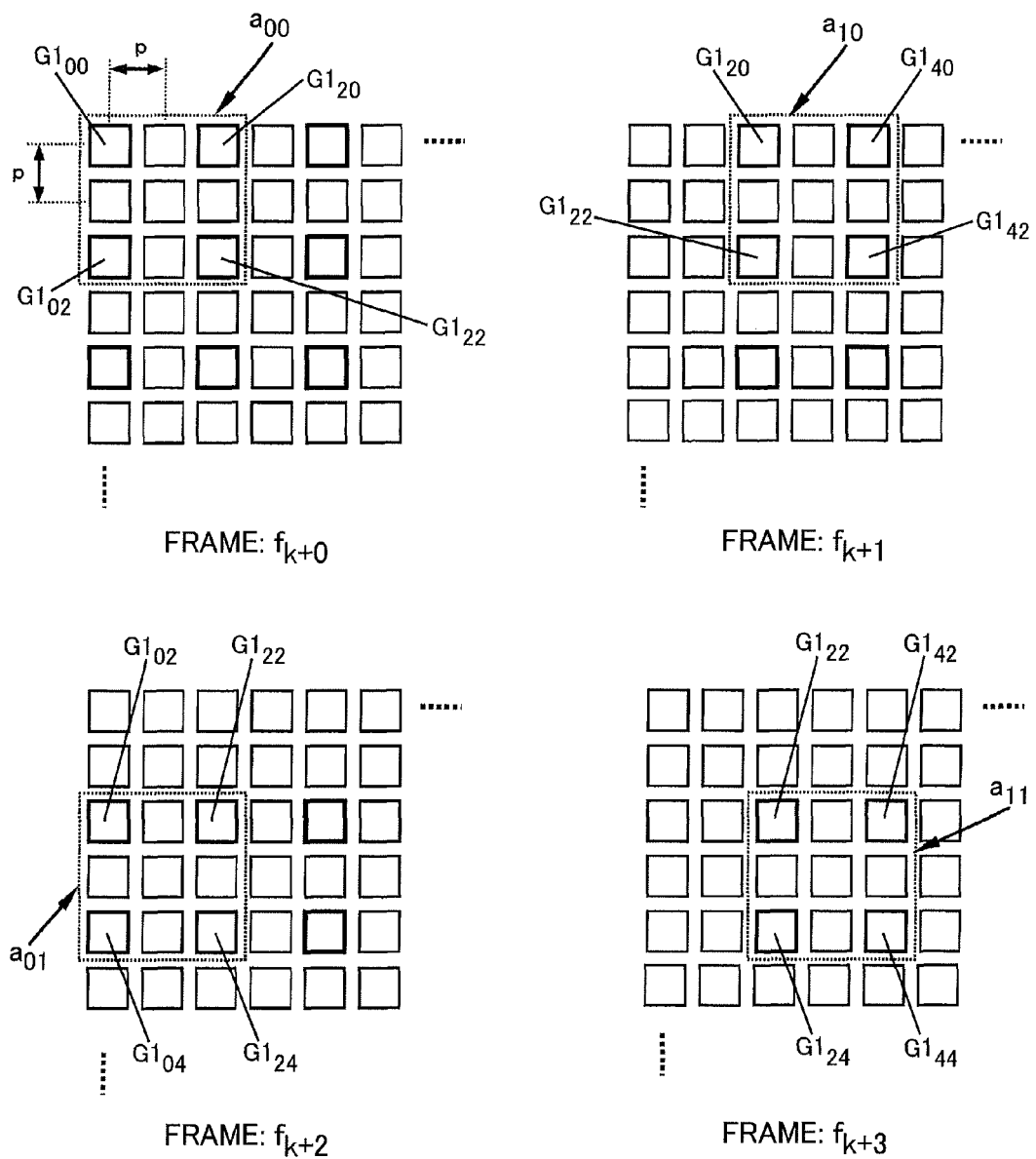
FIG. 36 is a view illustrating a second color image estimation method.

As illustrated in FIG. 36, the light-receiving values of G1 pixels (see the following expression (37)) are acquired by overlap sampling. The final estimated pixel value G1 is estimated from these light-receiving values.

$$a_{00}=G1_{00}+G1_{20}+G1_{02}+G1_{22},$$

$$a_{10}=G1_{20}+G1_{40}+G1_{22}+G1_{42},$$

$$a_{01}=G1_{02}+G1_{22}+G1_{04}+G1_{24},$$

$$a_{11}=G1_{22}+G1_{42}+G1_{24}+G1_{44},$$

Figure 37:
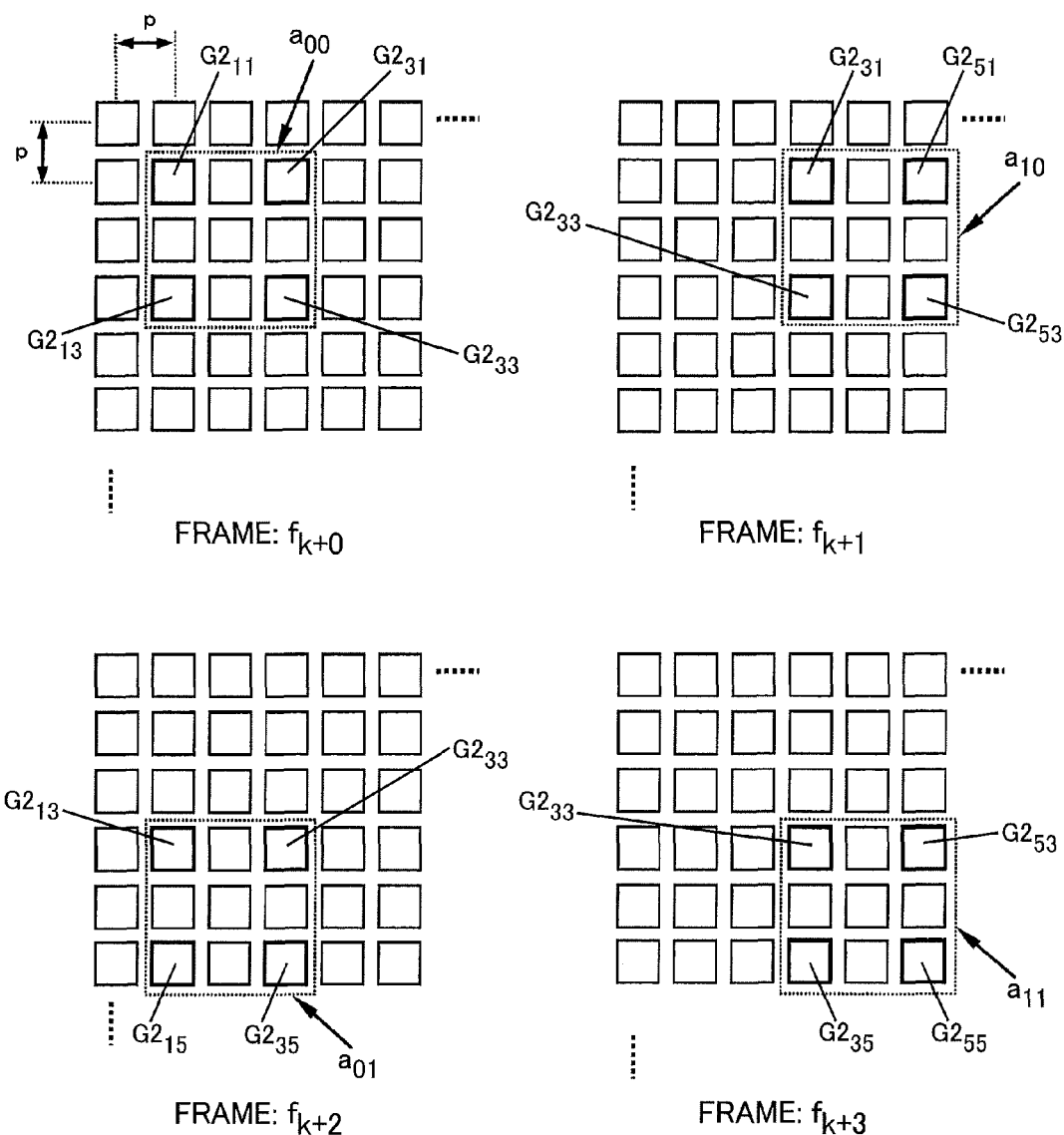
FIG. 37 is a view illustrating a second color image estimation method.

As illustrated in FIG. 37, the light-receiving values of G2 pixels (see the following expression (38)) are acquired in the same manner as described above. The final estimated pixel value G2 is estimated from these light-receiving values.

$$a_{00}=G2_{11}+G2_{31}+G2_{13}+G2_{33},$$

$$a_{10}=G2_{31}+G2_{51}+G2_{33}+G2_{53},$$

$$a_{01}=G2_{13}+G2_{33}+G2_{15}+G2_{35},$$

$$a_{11}=G2_{33}+G2_{53}+G2_{35}+G2_{55} \quad (38)$$

Figure 38:
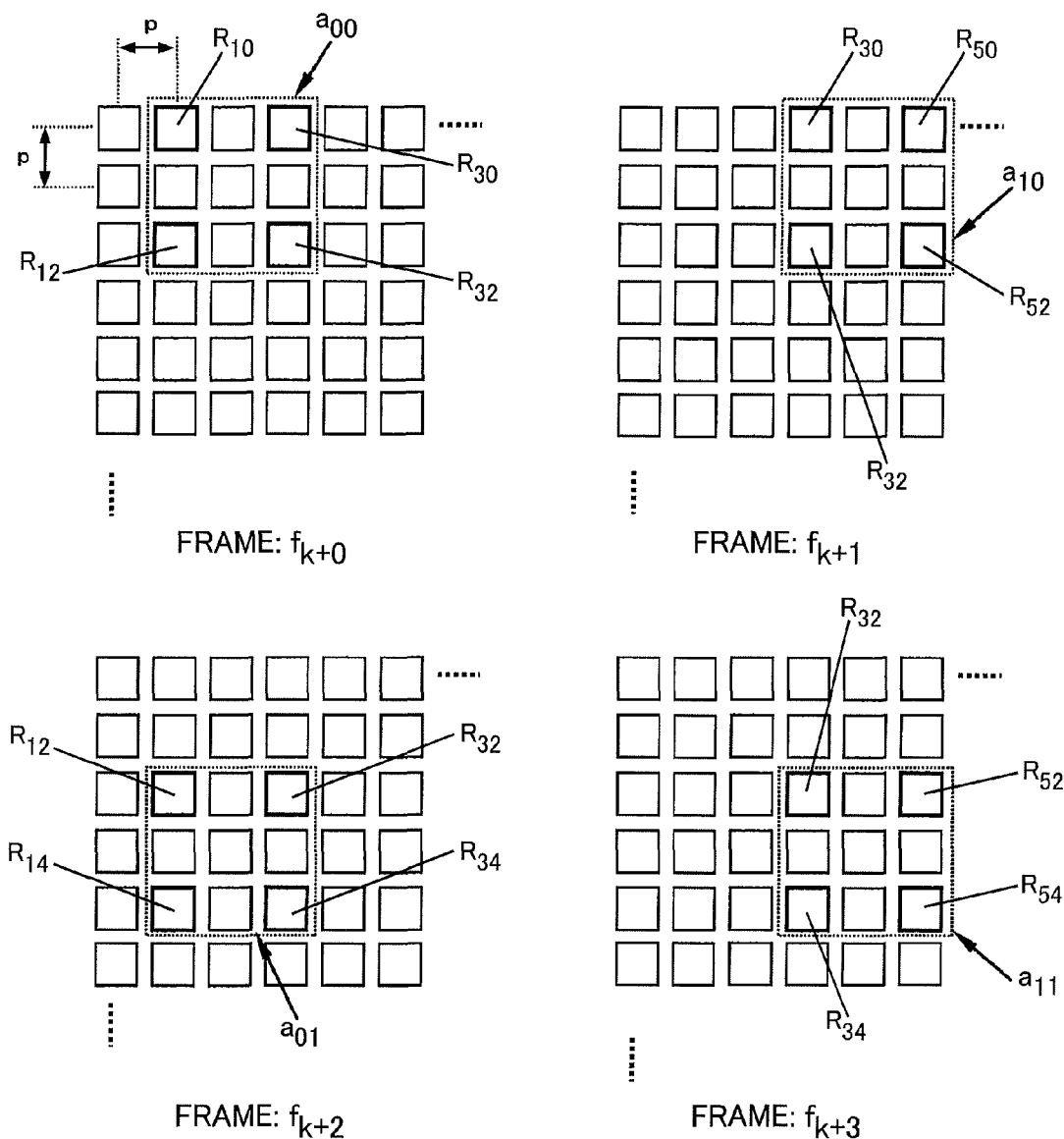
FIG. 38 is a view illustrating a second color image estimation method.

As illustrated in FIG. 38, the light-receiving values of R pixels (see the following expression (39)) are acquired. The final estimated pixel value R is estimated from these light-receiving values.

$$a_{00}=R_{10}+R_{30}+R_{12}+R_{32},$$

$$a_{10}=R_{30}+R_{50}+R_{32}+R_{52},$$

$$a_{01}=R_{12}+R_{32}+R_{14}+R_{34},$$

$$a_{11}=R_{32}+R_{52}+R_{34}+R_{54} \quad (39)$$

Figure 39:
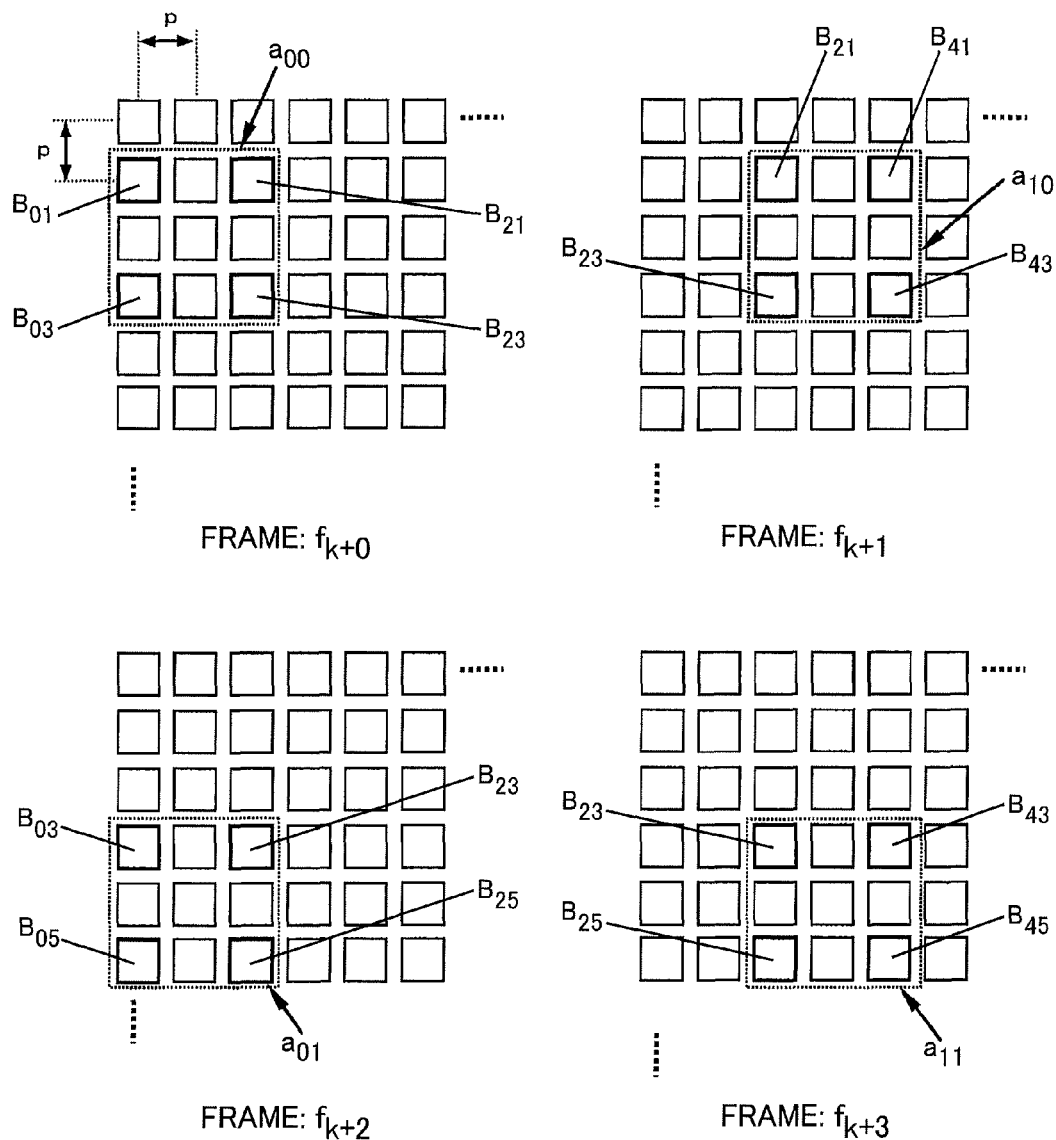
FIG. 39 is a view illustrating a second color image estimation method.

As illustrated in FIG. 39, the light-receiving values of B pixels (see the following expression (40)) are acquired. The final estimated pixel value B is estimated from these light-receiving values.

$$a_{00}=B_{01}+B_{21}+B_{03}+B_{23},$$

$$a_{10}=B_{21}+B_{41}+B_{23}+B_{43},$$

$$a_{01}=B_{03}+B_{23}+B_{05}+B_{25},$$

$$a_{11}=B_{23}+B_{43}+B_{25}+B_{45} \quad (40)$$

According to the second color image estimation method, a plurality of pixels (e.g., $G1_{00}$, $G1_{20}$, $G1_{02}$, and $G1_{22}$) corresponding to an identical color are set as the light-receiving unit, and the pixel values of the plurality of pixels corresponding to an identical color and set as the light-receiving unit are added up, and read ($a_{00}=G1_{00}+G1_{20}+G1_{02}+G1_{22}$) to acquire a low-resolution frame image. The pixel values (G1, G2, R, and B) of the pixels of the light-receiving unit are estimated based on the acquired low-resolution frame image, and a color high-resolution frame image is output based on the estimated pixel values.

This makes it possible to shoot a low-resolution frame image corresponding to each color at a high frame rate, and estimate the pixel values from the low-resolution frame image to acquire a color high-resolution frame image.

12. Method that Sets Number of Addition Target Pixels Corresponding to Brightness Although an example in which the light-receiving units are set on a four-pixel basis has been described above, the number of pixels of each light-receiving unit may be changed corresponding to the brightness of the shot image. A method that sets the number of addition target pixels corresponding to brightness is described below with reference to FIGS. 40 and 41.

Figure 40:
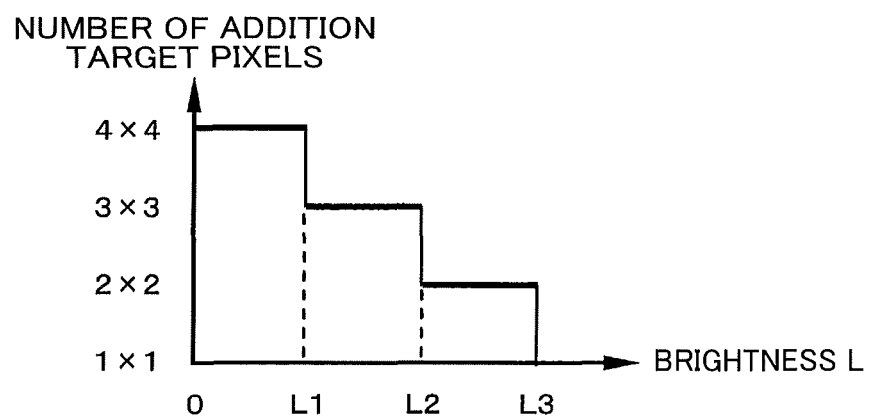
FIG. 40 is a view illustrating a method that sets the number of addition target pixels corresponding to brightness.

As illustrated in FIG. 40, adjacent 2×2 pixels are basically set as the addition target pixels, and adjacent 3×3 pixels are set as the addition target pixels when the average luminance value L (brightness in a broad sense) of the shot image has become lower than a threshold value L2. Adjacent 4×4 pixels are set as the addition target pixels when the average luminance value L has become lower than a threshold value L3 (L1<L2). The number of pixels of each light-receiving unit is set as described above, and overlap shift sampling and the pixel estimation process are performed to calculate the pixel values of a high-resolution image.

Figure 41:
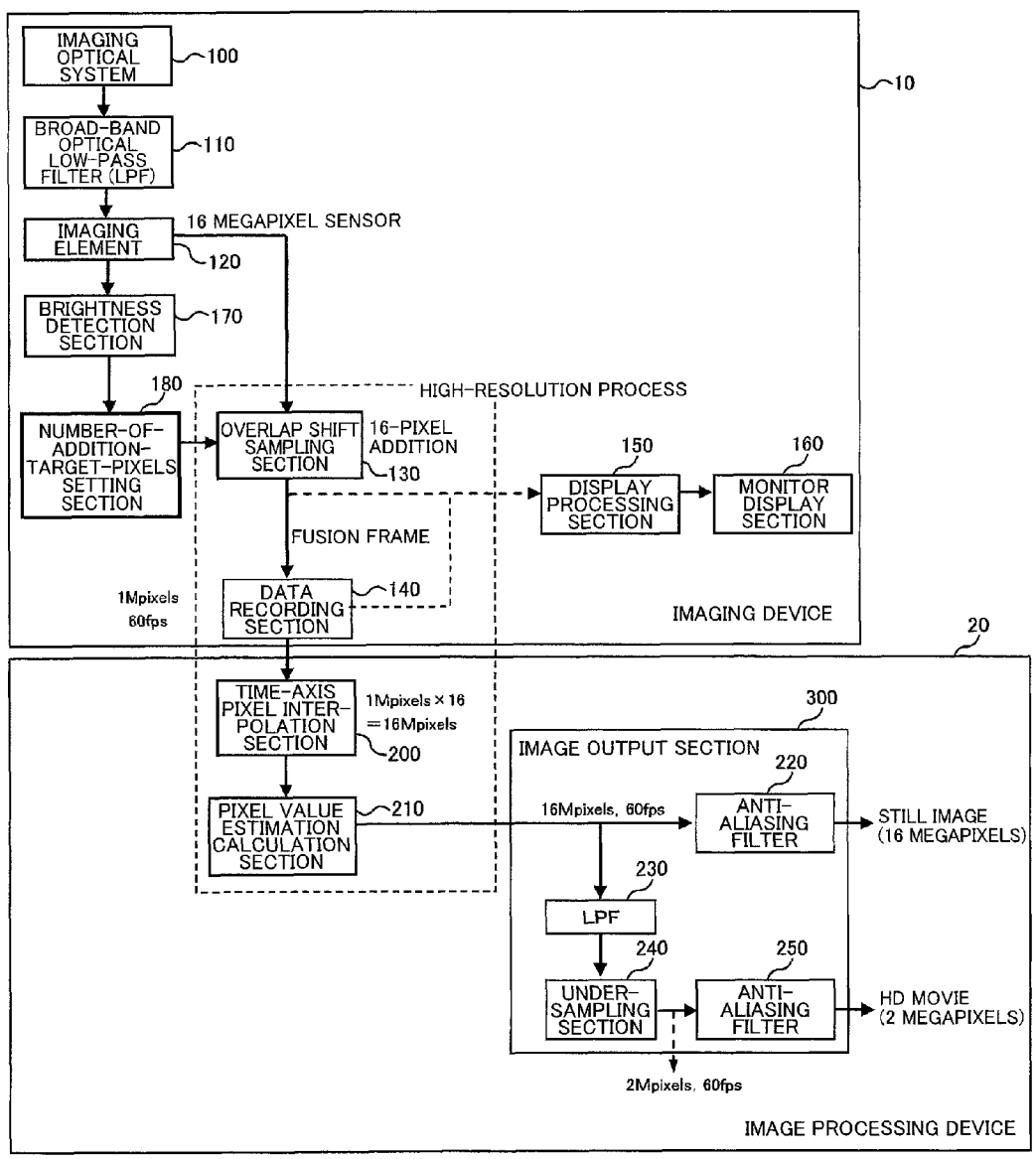
FIG. 41 illustrates a second specific configuration example of an imaging device and an image processing device.

FIG. 41 illustrates a second specific configuration example of an imaging device and an image processing device that variably set the number of addition target pixels corresponding to brightness. An imaging device 10 illustrated in FIG. 41 includes an imaging optical system 100, an optical low-pass filter 110, an image sensor 120, an overlap shift sampling section 130, a data recording section 140, a display processing section 150, a monitor display section 160, a brightness detection section 170, and a number-of-addition-target-pixels setting section 180. The image processing device 20 includes a time-axis pixel interpolation section 200, a pixel value estimation calculation section 210, and an image output section 300. Note that elements identical with the elements described with reference to FIG. 31 are indicated by identical reference symbols. Description of these elements is appropriately omitted.

The brightness detection section 170 calculates the average luminance of an image captured by the image sensor 120 (e.g., 16 megapixels). The number-of-addition-target-pixels setting section 180 sets the number of addition target pixels (e.g., 4×4=16 pixels) of each light-receiving unit corresponding to the average luminance calculated by the brightness detection section 170. The overlap shift sampling section 130 acquires a fusion frame (1 megapixels) using the number of addition target pixels set by the number-of-addition-target-pixels setting section 180. The pixel value estimation calculation section 210 estimates the final estimated pixel values (16 megapixels) from the fusion frames. The image output section 300 outputs a still image (16 megapixels) or a High-Vision movie (2 megapixels) based on the final estimated pixel values.

According to the above configuration, the number of pixels included in the light-receiving unit is increased as the brightness (average luminance) of the object decreases.

This makes it possible to increase the number of addition target pixels as the brightness of the object decreases, and reduce random noise. Moreover, it is possible to shoot a low-resolution frame image with higher sensitivity as the brightness of the object decreases, and improve the sensitivity of the estimated high-resolution frame image.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., light-receiving value acquisition unit, intermediate estimated pixel value, and overlap shift sampling) cited with a different term (e.g., light-receiving unit, intermediate pixel value, and pixel shift process) having a broader meaning or the same meaning at least once in the specification and the drawings can be replaced by the different term in any place in the specification and the drawings. The configurations and the operations of the readout control section, the interpolation section, the estimation section, the image output section, the imaging device, the image processing device, and the like are not limited to those described in connection with the above embodiments. Various modifications and variations may be made.

What is claimed is:

1. An image processing device comprising:
a storage section that stores a low-resolution frame image acquired based on a light-receiving value, a light-receiving unit being a unit for acquiring the light-receiving value, the light-receiving unit being set corresponding to a plurality of pixels of a color image sensor that are adjacent in a horizontal direction and a vertical direction, and pixel values of the plurality of pixels included in the light-receiving unit being added up and read as the light-receiving value of the light-receiving unit;
an estimation calculation section that estimates pixel values of pixels included in the light-receiving unit based on a plurality of low-resolution frame images stored in the storage section; and
an image output section that outputs a high-resolution frame image having a resolution higher than that of the low-resolution frame image based on the pixel values estimated by the estimation calculation section,
the storage section storing the low-resolution frame images acquired by sequentially performing a pixel shift process that shifts the light-receiving unit by one pixel of the color image sensor, light-receiving units obtained by sequentially performing the pixel shift process overlapping each other, the low-resolution frame images being stored in a number equal to a number of pixels included in the light-receiving unit, and
the estimation calculation section estimating the pixel values of the pixels included in the light-receiving unit based on the low-resolution frame images obtained by sequentially performing the pixel shift process.

2. The image processing device as defined in claim 1,
the light-receiving units being sequentially set at a first position and a second position subsequent to the first position using the pixel shift process, and the light-receiving unit set at the first position and the light-receiving unit set at the second position overlapping each other in an overlapping area,
the estimation calculation section calculating a difference between a light-receiving value of the light-receiving unit set at the first position and a light-receiving value of the light-receiving unit set at the second position,
the estimation calculation section expressing a relational expression between a first intermediate pixel value and a second intermediate pixel value using the difference, the first intermediate pixel value being a light-receiving value of a first light-receiving area that is an area obtained by removing the overlapping area from the light-receiving unit set at the first position, and the second intermediate pixel value being a light-receiving value of a second light-receiving area that is an area obtained by removing the overlapping area from the light-receiving unit set at the second position, and
the estimation calculation section estimating the first intermediate pixel value and the second intermediate pixel value using the relational expression, and calculating the pixel values of the pixels included in the light-receiving unit using the estimated first intermediate pixel value.

3. The image processing device as defined in claim 2,
the estimation calculation section expressing a relational expression between intermediate pixel values using the light-receiving value of the light-receiving unit, the intermediate pixel values being included in an intermediate pixel value pattern, the intermediate pixel value pattern including consecutive intermediate pixel values including the first intermediate pixel value and the second intermediate pixel value,
the estimation calculation section comparing the intermediate pixel value pattern expressed by the relational expression between the intermediate pixel values and the light-receiving values of the light-receiving units to evaluate similarity, and
the estimation calculation section determining the intermediate pixel values included in the intermediate pixel value pattern based on a similarity evaluation result so that the similarity becomes a maximum.

4. The image processing device as defined in claim 1,
the pixel values of the light-receiving unit being subjected to a weighted summation process using a weighting coefficient corresponding to a pixel position in the light-receiving unit, and read as the light-receiving value of the light-receiving unit, and
the estimation calculation section estimating the pixel values of the pixels included in the light-receiving unit based on the light-receiving values of the light-receiving units obtained by the weighted summation process.

5. The image processing device as defined in claim 1,
the pixel shift process being performed in each frame, consecutive low-resolution frame images being acquired in time series,
the image processing device further comprising an interpolation section that interpolates the light-receiving value of the light-receiving unit at a missing position in the low-resolution frame image by a time-axis interpolation process using the light-receiving values of the light-receiving units in the low-resolution frame images in respectively preceding or following frames, and
the estimation calculation section estimating the pixel values of the pixels included in the light-receiving unit in each frame based on the low-resolution frame images subjected to the time-axis interpolation process.

6. The image processing device as defined in claim 5,
the image output section outputting the high-resolution frame image in each frame as a movie, and the high-resolution frame image being based on the pixel values of the pixels included in the light-receiving unit in each frame that have been estimated by the estimation calculation section.

7. The image processing device as defined in claim 5,
the interpolation section performing the time-axis interpolation process using a time-axis interpolation filtering process.

8. The image processing device as defined in claim 5,
the interpolation section interpolating the light-receiving value of the light-receiving unit at the missing position using the light-receiving value of the light-receiving unit at a position identical with the missing position in the preceding or following frame when a difference between the light-receiving values of the light-receiving units in the respectively preceding or following frames is smaller than a given threshold value, and the interpolation section interpolating the light-receiving value of the light-receiving unit at the missing position using the light-receiving value acquired in the each frame when the difference between the light-receiving values of the light-receiving units in the respectively preceding or following frames is larger than the given threshold value.

9. The image processing device as defined in claim 1, wherein the number of pixels included in the light-receiving unit being set corresponding to brightness of an image captured by the image sensor.

10. An imaging device comprising:

a color image sensor;

a readout control section that sets a light-receiving unit corresponding to a plurality of pixels of the color image sensor that are adjacent in a horizontal direction and a vertical direction, and adds up and reads pixel values of the plurality of pixels included in the light-receiving unit as a light-receiving value of the light-receiving unit to acquire a low-resolution frame image;

a storage section that stores the low-resolution frame image acquired by the readout control section;

an estimation calculation section that estimates pixel values of pixels included in the light-receiving unit based on a plurality of low-resolution frame images stored in the storage section; and an image output section that outputs a high-resolution frame image having a resolution higher than that of the low-resolution frame image based on the pixel values estimated by the estimation calculation section, the readout control section acquiring the low-resolution frame images by sequentially performing a pixel shift process that shifts the light-receiving unit by one pixel of the color image sensor, light-receiving units obtained by sequentially performing the pixel shift process overlapping each other, the low-resolution frame images being acquired in a number equal to a number of pixels included in the light-receiving unit, and the estimation calculation section estimating the pixel values of the pixels included in the light-receiving unit based on the low-resolution frame images obtained by sequentially performing the pixel shift process.

11. An image processing method comprising:

storing a low-resolution frame image acquired based on a light-receiving value, a light-receiving unit being a unit for acquiring the light-receiving value, the light-receiving unit being set corresponding to a plurality of pixels of a color image sensor that are adjacent in a horizontal direction and a vertical direction, and pixel values of the plurality of pixels included in the light-receiving unit being added up and read as the light-receiving value of the light-receiving unit, the low-resolution frame images being acquired by sequentially performing a pixel shift process that shifts the light-receiving unit by one pixel of the color image sensor, light-receiving units obtained by sequentially performing the pixel shift process overlapping each other, and the low-resolution frame images being stored in a number equal to a number of pixels included in the light-receiving unit;

estimating pixel values of pixels included in the light-receiving unit based on a plurality of low-resolution frame images, a plurality of light-receiving values forming the plurality of low-resolution frame images, and the plurality of low-resolution frame images being obtained by sequentially performing the pixel shift process; and outputting a high-resolution frame image having a resolution higher than that of the low-resolution frame image based on the estimated pixel values.

12. The image processing device as defined in claim 4, wherein the weighting coefficient $C(x, y)$ corresponding to the pixel position $(x, y)$ in the light-receiving unit being $C(x, y)=1/r^{(X+Y)}$, x being a pixel position in the light-receiving unit in the horizontal direction, y being a pixel position in the light-receiving unit in the vertical direction, a pixel position in the light-receiving unit at a left end in the horizontal direction and an upper end in the vertical direction being $(x, y)=(0, 0)$, a rightward direction along the horizontal direction being a positive x-direction, a downward direction along the vertical direction being a positive y-direction, and r being a real number larger than 1.

13. The image processing device as defined in claim 9, wherein the brightness being an average luminance of the image.

14. The image processing device as defined in claim 13, wherein the number of pixels included in the light-receiving unit being increased when the average luminance is lower than a given threshold value.

* * * * *